(12) United States Patent
Eldar et al.

(10) Patent No.: US 7,513,589 B2
(45) Date of Patent: Apr. 7, 2009

(54) MULTIPASS PRINTING

(75) Inventors: Dror Eldar, Raanana (IL); Eyal Gargir, Kefar Sava (IL); Ronny Tuttnauer, Netanya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 11/669,516

(22) Filed: Jan. 31, 2007

(65) Prior Publication Data

US 2008/0180475 A1 Jul. 31, 2008

(51) Int. Cl.
*B41J 2/205* (2006.01)
(52) U.S. Cl. .......................................... 347/15; 347/43
(58) Field of Classification Search .................. 347/14, 347/15, 43
See application file for complete search history.

(56) References Cited

U.S. PATENT DOCUMENTS

| | | | |
|---|---|---|---|
| 5,854,882 A * | 12/1998 | Wang | 358/1.9 |
| 6,193,347 B1 | 2/2001 | Askeland et al. | |
| 6,505,905 B1 | 1/2003 | Krouss | |
| 6,631,964 B2 * | 10/2003 | Askeland et al. | 347/15 |
| 2008/0036811 A1 * | 2/2008 | Heydinger | 347/15 |

FOREIGN PATENT DOCUMENTS

EP   1 382 457   1/2004

* cited by examiner

*Primary Examiner*—Thinh H Nguyen

(57) ABSTRACT

A multi-pass printing system and a corresponding method are provided for printing an image, which includes a plurality of continuous-tone values, based on halftone matrices having threshold values. The printed image is composed of sub-images, each of which includes dots printed in a respective pass. The sub-images present independent dot patterns at corresponding places. The printing system is arranged to obtain the sub-images by splitting the continuous-tone values into at least two pass values, an individual pass value indicating an intensity to be printed in a respective pass. Then, in one pass a first halftone matrix for printing the respective pass values, and in another pass one or more second halftone matrices are used, which are obtained by positionally shifting the threshold values of the first halftone matrix, for printing all pass values of the other pass, or at least those pass values above a highlight threshold.

29 Claims, 16 Drawing Sheets

Fig. 6

8-BIT PIXELMAP (ORIGINAL IMAGE, 100 %)

|   | A | B | C | D | E | F |   |   |
|---|---|---|---|---|---|---|---|---|
| 1 | 250 | 193 | 125 | 73 | 70 | 58 | . | . |
| 2 | 246 | 181 | 105 | 59 | 57 | 97 | . | . |
| 3 | 230 | 172 | 94 | 48 | 45 | 150 | . | . |
| 4 | 212 | 158 | 72 | 40 | 34 | 242 | . | . |
|   | . | . | . | . | . | . | . | . |
|   | . | . | . | . | . | . | . | . |

← PRINTING MASK →

8-BIT PIXELMAP (40 %)

|   | A | B | C | D | E | F |   |   |
|---|---|---|---|---|---|---|---|---|
| 1 | 100 | 77 | 50 | 29 | 28 | 23 | . | . |
| 2 | 98 | 72 | 42 | 23 | 22 | 39 | . | . |
| 3 | 92 | 68 | 37 | 19 | 18 | 60 | . | . |
| 4 | 84 | 63 | 28 | 16 | 13 | 97 | . | . |
|   | . | . | . | . | . | . | . | . |

8-BIT PIXELMAP (60 %)

|   | A | B | C | D | E | F |   |   |
|---|---|---|---|---|---|---|---|---|
| 1 | 150 | 116 | 75 | 44 | 42 | 35 | . | . |
| 2 | 148 | 109 | 63 | 36 | 35 | 58 | . | . |
| 3 | 138 | 104 | 57 | 29 | 27 | 90 | . | . |
| 4 | 128 | 95 | 44 | 24 | 21 | 145 | . | . |
|   | . | . | . | . | . | . | . | . |

Fig. 7b
SAME MATRIX FOR BOTH PASSES
8-BIT PIXELMAP (60 %)  
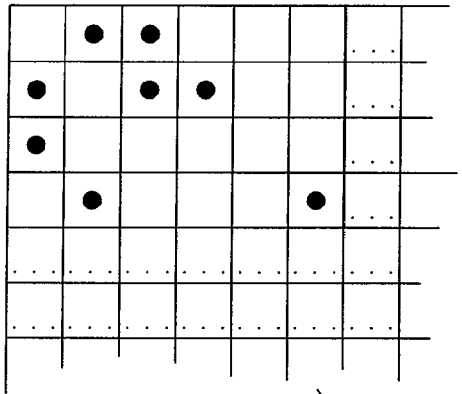
8-BIT PIXELMAP (40 %)  
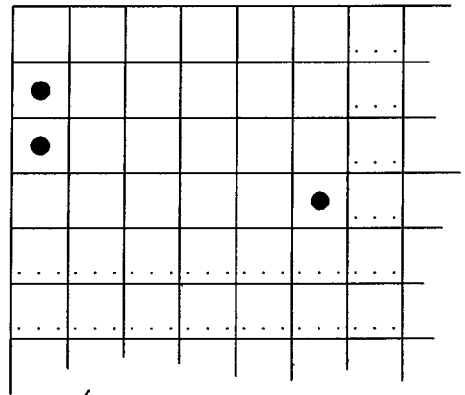
1. PASS BITMAP
2. PASS BITMAP
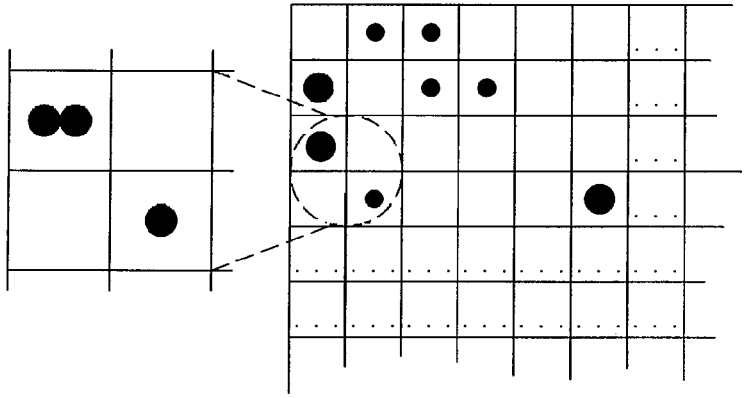
INCREASE OF  
LOW FREQUENCIES

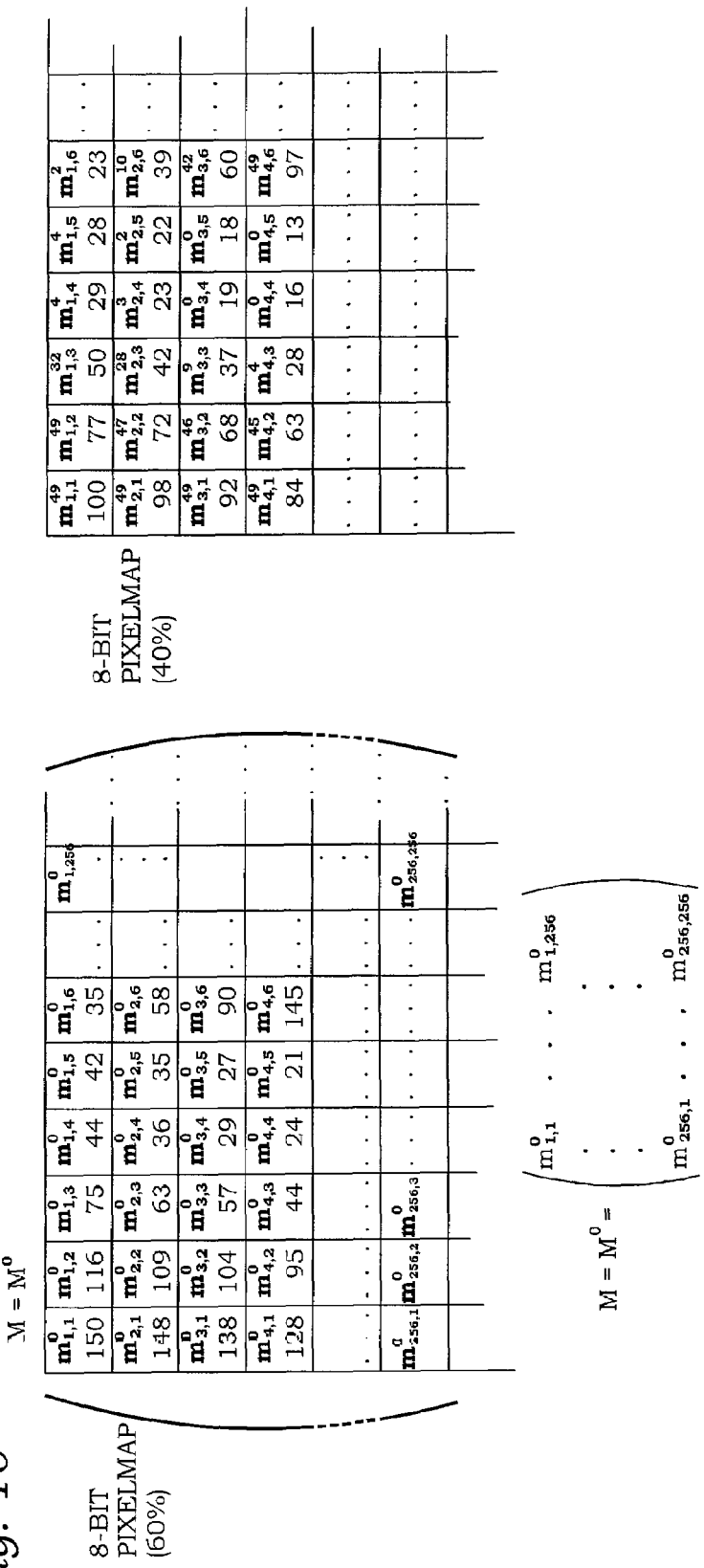

*Fig. 14*

|   | PASS | PASS VALUE | HALFTONING MODEL |
|---|---|---|---|
| a) | 1. | 33% | BLUE NOISE (ED) |
|    | 2. | 33% | BLUE NOISE (HM) |
|    | 3. | 33% | GREEN NOISE (HM) |
| b) | 1. | 25% | GREEN NOISE (HM) |
|    | 2. | 25% | BLUE NOISE (ED I) |
|    | 3. | 25% | BLUE NOISE (ED II) |
|    | 4. | 25% | BLUE NOISE (ED III) |
| c) | 1. | 10% | GREEN NOISE (HM) |
|    | 2. | 20% | BLUE NOISE (ED I) |
|    | 3. | 30% | BLUE NOISE (ED I) |
|    | 4. | 40% | BLUE NOISE (ED I) |
| d) | 1. | 10% | GREEN NOISE (HM) |
|    | 2. | 20% | BLUE NOISE (ED III) |
|    | 3. | 30% | BLUE NOISE (ED II) |
|    | 4. | 40% | BLUE NOISE (ED I) |

Fig. 15

| APPROACH # | APPROACH | ASPECT OF THE INVENTION | GRAININESS EFFECT IN HIGHLIGHT AREAS | | | GRAININESS EFFECT IN MEDIUM AND DARK AREAS | | | OVERPRINTING | DEPENDENT/ INDEPENDENT SUB-IMAGES | FIG. |
|---|---|---|---|---|---|---|---|---|---|---|---|
| | | | A | B | C | A | B | C | | | |
| 1 | SPLIT 60%-40% ERROR DIFFUSION (US 6,505,905) | — | ← | — | — | — | — | — | YES | INDEPENDENT | — |
| 2 | SINGLE-PASS (BANDING EFFECTS) | — | → | (→) | (→) | — | — | — | NO | — | 7a |
| 3 | SAME MATRIX | 1 | ← | (←) | (←) | — | ← | ← | YES | DEPENDENT | 7b |
| 4 | GLOBAL SHIFT INDEPENDENT MATRICES | 1 | → | (→) | (→) | — | → | → | YES | INDEPENDENT | 8 |
| 5 | ADAPTIVE SHIFT | 1 | — | (→) | (→) | — | → | → | YES | DEP./INDEP. | 9/10 |
| 6 | INDEPENDENT SUB-IMAGES + PRINT HIGHLIGHT PIXELS ONLY ONCE | 2 | — | — | — | — | → | → | YES | —/INDEP. | 11a/ 11b |

3. ASPECT: OVERPRINTING CAUSES LOSS OF DENSITY ⇒ COMPENSATE FOR LOSS OF DENSITY BY INCREASING PASS VALUES SUCH THAT SUM OF PASS VALUES IS LARGER THAN ORIGINAL CONTINUOUS-TONE VALUE.
- MAY BE EMPLOYED IN ALL KINDS OF MULTIPASS-PRINTING
- MAY BE EMPLOYED IN ERROR DIFFUSION / MATRIX-BASED TECHNIQUES
- MAY BE COMBINED WITH GRAININESS-REDUCTION (APPROACH #4, #5, AND #6)

4. ASPECT: OBTAINING INDEPENDENT SUB-IMAGES BY USING DIFFERENT HALFTONING MODELS.
- MAY BE COMBINED WITH GRAININESS-REDUCTION (APPROACH #6)

MULTIPASS PRINTING

FIELD OF THE INVENTION

The present invention refers to printing technology, and for example to multi-pass-printing.

BACKGROUND OF THE INVENTION

Conventional printers, for example commercial computer printers for use in the office or home for printing out images in general including photographs, drawings, text, web pages and the like, and industrial printers for printing e.g. billboards and display posters use a process of digital halftoning to convert electronic image data into print instructions sent to a printhead in order to print a plurality of small dots onto a printing medium e.g. paper, to create an image on the printing medium. Typically for text or line drawings, halftoning is not needed, because lines are printed solid. However, halftoning is used for printing images having varying shades of color or gray, such as photographs.

Halftoning is the transformation of a grayscale or color image to a pattern of small spots with a limited number of colors (e.g. just black dots on white background, or spots of the primary colors cyan, magenta and yellow), in order to make it printable. Printing is in its bare essence a binary process for each point on the paper: put ink (or tone) on a paper or leave the paper uncovered (e.g. white). This would suggest that only binary images could be printed. However, halftoning makes it possible to reproduce so-called continuous-tone images, which are images with different shades of gray or color. The halftone process creates patterns of dots on a background. When viewed from a sufficient distance, the human viewer will be unable to see the dots themselves, because they are too small. Instead, the human viewer will have the illusion of a gray or continuous-tone color. In grayscale halftoning, only black dots are created, whereas in color halftoning dots of the three primary colors of subtractive color mixing, cyan, magenta, and yellow (=color separation) are created and printed on top of one another.

U.S. Pat. No. 6,505,905 describes a halftoning method in which continuous-tone values representing dots of an image are split into two or more pass values, e.g. in a relationship 60% to 40%. The pass values are then subjected to an error diffusion procedure which results in two or more independent sub-images induced by the pass values. In a first pass, e.g. from left to right, the result of the error diffusion of the 60%-value is printed, and in the second pass, the result of the error diffusion of the 40%-value is printed.

U.S. Pat. No. 6,193,347 refers to a hybrid multi-drop/multi-pass printing system, where the printing activity between the different passes is highly correlated and dependent.

SUMMARY OF THE INVENTION

According to a first aspect of the invention, a multi-pass printing system and a corresponding printing method are provided for printing an image, including a plurality of continuous-tone values, based on halftone matrices having threshold values. The printed image is composed of sub-images, each of which includes dots printed in a respective pass. The sub-images present independent dot patterns at corresponding places. The printing system is arranged to obtain the sub-images by splitting the continuous-tone values into at least two pass values. An individual pass value indicates an intensity to be printed in a respective pass. In one pass, a first halftone matrix is used for printing the respective pass values. In another pass, one or more second halftone matrices, obtained by positionally shifting the threshold values of the first halftone matrix, are used for printing all pass values of the other pass, or at least those pass values above a highlight threshold.

According to a second aspect of the invention, a multi-pass printing system is provided for printing an image including a plurality of continuous-tone values to be printed as dot patterns. The printed image is composed of sub-images, each of which includes the dots printed in a respective pass. The sub-images are obtained by independently halftoning split continuous-tone values. The printing system is arranged to split the continuous-tone values such that if a continuous-tone value is greater than or equal to a highlight threshold, the continuous-tone value is split into a first number of pass values. Otherwise, the continuous-tone value is split into a second, smaller number of pass values. An individual pass value indicates an intensity to be printed in a respective pass. The continuous-tone values of the image are printed in the first and second numbers of pass values, respectively.

According to a third aspect of the invention, a multi-pass printing system is provided for printing a continuous-tone value of an image including a plurality of continuous-tone values to be printed as dot patterns. The printed image is composed of sub-images, each of which includes the dots printed in a respective pass. The sub-images are obtained by independently halftoning split continuous-tone values. The printing system is arranged to split the continuous-tone value to be printed into at least two pass values. An individual pass value indicates an intensity to be printed in a respective pass, wherein the splitting includes a correction for an overprint effect such that the sum of the pass values corresponding to the continuous-tone value exceeds the continuous-tone value. The continuous-tone value is printed in the number of pass values.

According to a fourth aspect of the invention, a multi-pass printing system is provided for printing an image including a plurality of continuous-tone values to be printed as dot patterns. The printed image is composed of sub-images, each of which includes the dots printed in a corresponding pass. The sub-images present independent dot patterns at corresponding places. The printing system is arranged to obtain the sub-images by splitting the continuous-tone values into at least two pass is values, wherein an individual pass value indicates an intensity to be printed in a respective pass. At least two different halftoning models are used in different passes to print the respective pass value.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 6 illustrates an application of a split curve to continuous-tone values of an image;

FIG. 7b shows a dot distribution obtained by applying the same halftone matrix for two passes;

FIG. 10 shows the application of an adaptively shifted halftone matrix to an image according to embodiments of the invention;

FIG. 14 illustrates the usage of different halftoning models to obtain independent sub-images, according to a fourth aspect of the invention;

FIG. 15 is a summary of the four aspects of the invention and their background.

The drawings and the description of the drawings are of embodiments of the invention and not of the invention itself.

DESCRIPTION OF THE PREFERRED EMBODIMENTS

Figure 1:
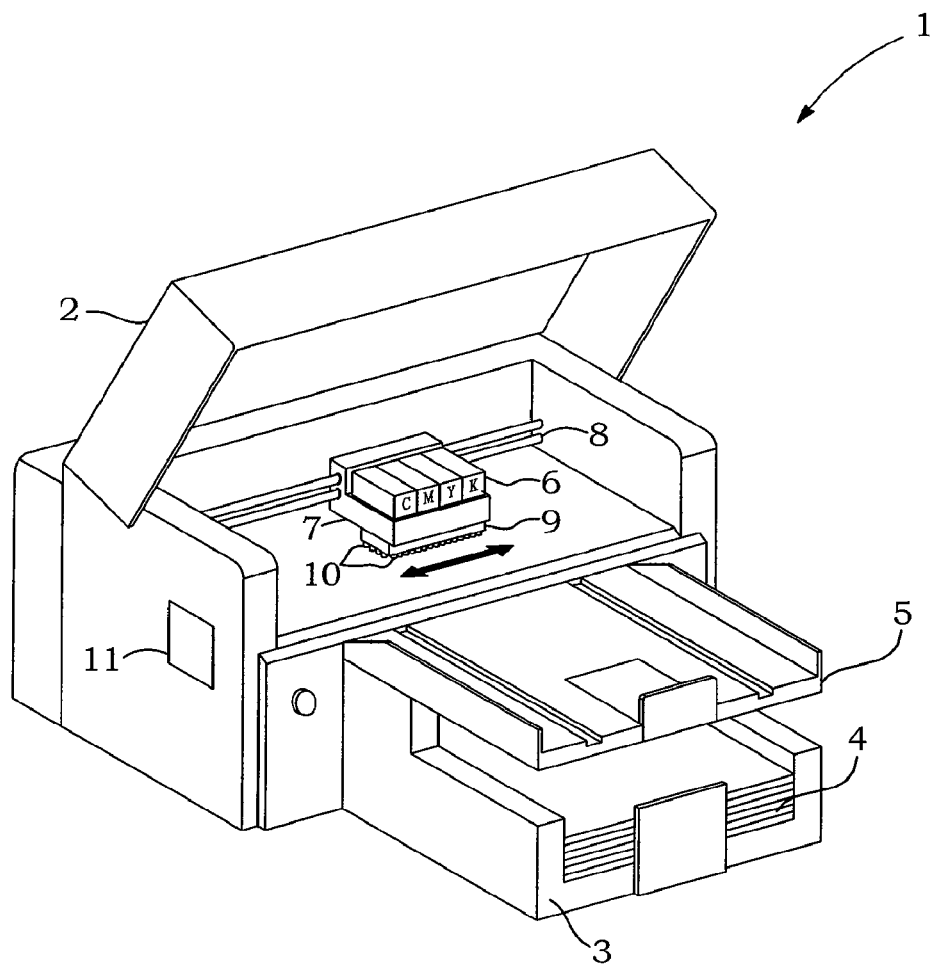
FIG. 1 illustrates a bi-directional inkjet printer, according to embodiments of the aspects of the invention.

FIG. 1 shows a multi-pass color inkjet printer. However, before proceeding further with the description of FIG. 1, a few items of the embodiments will be discussed.

In some of the embodiments of a first aspect of the invention, a multi-pass printing system is provided for printing an image, including a plurality of continuous-tone values, based on halftone matrices having threshold values. The printed image is composed of sub-images, each of which includes dots printed in a respective pass. The sub-images present independent dot patterns at corresponding places which are obtained by splitting the continuous-tone values into at least two pass values. An individual pass value indicates an intensity to be printed in a respective pass. In one pass, a first halftone matrix is used for printing the respective pass values. In another pass, one or more second halftone matrices, obtained by positionally shifting the is threshold values of the first halftone matrix, are used for printing all pass values of the other pass, or at least those pass values above a highlight threshold.

Before discussing embodiments of this first aspect of the invention in more detail, some background information on digital halftoning will be given in the following.

Ulichney gives a definition of digital halftoning as "... any algorithmic process which creates the illusion of continuous-tone images from the judicious arrangement of binary picture elements."

The concept of resolution is essential to the understanding of digital halftoning. Resolution may be defined as "fineness" and is used to describe the level of detail in a digitally sampled signal. Typically, when one hears the term "resolution" applied to images, one thinks of what's known as "spatial resolution", which is the basic sampling rate for the image. It describes the fineness of the "dots" which comprise the image, i.e. how many of them are present along each horizontal and vertical inch. However, one may also speak of "intensity resolution" or "color resolution" which describes the fineness of detail available at each spot, i.e. the number of different gray shades or colors in the image.

1. Classical Halftoning

Leaving the digital domain and looking at the classical printing technique of halftoning. Modern halftone printing was invented in the late 1800's, and halftones of that period are even today considered to be attractive renditions. Essentially, halftoning involves the printing of dots of different sizes in an ordered and closely spaced pattern in order to simulate various intensities. It was realized that when viewing a small area at normal viewing distances, our eyes perform a blending or smoothing function on the fine detail within that area. As a result, only the overall intensity of the area is perceived. This is known as spatial integration.

2. Patterning

Patterning was the first digital technique to pay homage to the classical halftone. It takes advantage of the fact that the spatial resolution of printing devices had improved to the point where one could trade some of it for better intensity resolution. For each possible continuous value in the image, a pattern of pixels is created that approximates that value. Remembering the concept of spatial integration, if the appropriate patterns are chosen, one may simulate the appearance of various intensity levels—even though the printing device may only generate a limited set of intensities. For example, a 3×3 pattern may have one of $2^9$=512 different arrangements of pixels: however, in terms of intensity, not all of them are unique. Since the number of black pixels in the pattern determines the darkness of the pattern, there are effectively only 10 discrete intensity patterns (including the all-white pattern), each one having one more black pixel than the previous one. The question arises which 10 patterns should be chosen. The following four patterns are eliminated:

| . . . | • . . | . . • | • . . |
|-------|-------|-------|-------|
| • • • | . • . | . • . | • . . |
| . . . | . . • | • . . | • . . | because if they were repeated over a large area (a common occurrence in many images) they would create vertical, horizontal, or diagonal lines. Also, studies have shown that patterns should form a "growth sequence": once a pixel is intensified for a particular value, it should remain intensified for all subsequent values. In this fashion, each pattern is a superset of the previous one; this similarity between adjacent intensity patterns minimizes any contouring artifacts.

Here are appropriate patterns for a 3×3 matrix which subscribe to the rules set forth above:

| (i) | (ii) | (iii) | (iv) |
|-----|------|-------|------|
| . . . | . . . | . . . | . • . |
| . . . | . • . | . • • | . • • |
| . . . | . . . | . . . | . . . |
| (v) | (vi) | (vii) | (viii) |
| . • • | . • • | . • • | . • • |
| . • • | . • • | • • • | • • • |
| . . . | . • . | . • . | • • . |
| (ix) | | (x) | |
| • • • | | • • • | |
| • • • | | • • • | |
| • • . | | • • • | |

These patterns effectively simulate a screened halftone with dots of various sizes. In large areas of constant value, the repetitive pattern formed will be mostly artifact-free.

However, applying this patterning process to an image will triple its size in each direction. Because of this, patterning may only be used where the printing device's spatial resolution is much greater than that of the image. Another limitation of patterning is that the effective spatial resolution is decreased since a multiple-pixel cell is used to simulate the single, larger halftone dot. The more intensity resolution is desired, the larger the halftone cell used and, by extension, the lower the spatial resolution.

In the above example, using 3×3 patterning, 10 intensity levels may be simulated, but the spatial resolution is reduced to ⅓ of the original figure. To get 64 intensity levels, an 8×8 pattern needs to be applied which is combined with an eight-fold decrease in spatial resolution. To get 256 levels of intensity (8-bit representation of the image), a 16×16 pattern would be needed which would incur a 16-fold reduction in spatial resolution. Because of this size distortion of the image, and with the development of more effective digital halftoning methods, patterning is only infrequently used today.

The patterning diagrammed above is called a "clustered" pattern, so called because as new pixels are intensified in each pattern, they are placed adjacent to the already-intensified pixels. Clustered-dot patterns were used on many of the early printing devices which could not render individual pixels very distinctly, e.g. printing presses or other printers which smear the printed dots slightly. Clustered-dot groupings tend to hide the effect of dot gain, but also produce a somewhat grainy image. Research showed that especially with larger patterns, the dispersed (non-clustered) layout was more pleasing. Here is one such pattern:

| (i) | (ii) | (iii) | (iv) |
|---|---|---|---|
| - - - | • - - | • - - | • - - |
| - - - | - - - | - - - | - - • |
| - - - | - - - | - • - | - • - |

| (v) | (vi) | (vii) | (viii) |
|---|---|---|---|
| • - • | • - • | • - • | • • • |
| - - • | • - • | • - • | • - • |
| - • - | - • - | • • - | • • - |

| (ix) | (x) |
|---|---|
| • • • | • • • |
| • • - | • • • |
| • • - | • • • |

3. Dithering

In the following, the term "dithering" is used as a subcategory of halftoning. Dithering implies that the resolution of the original image is maintained, i.e. a pixel (continuous-tone value) of the image and a printed dot are on the same level. Dithering may be classified in a) neighborhood-independent dithering and b) neighborhood-dependent dithering.

a) Neighborhood-Independent Dithering i) Ordered Dithering

While patterning was an important step toward the reproduction of the classic halftone, its main shortcoming was the special enlargement (and corresponding reduction in resolution) of the image. Ordered dither represents a major improvement in digital halftoning where this spatial distortion was eliminated and the image could then be rendered in its original size. Obviously, in order to accomplish this, each dot in the source image is mapped to a pixel on the printing device on a one to one basis. Accordingly, the patterning concept was redefined so that instead of plotting the whole pattern for each image dot, the image dot is mapped only to one pixel in the pattern. Returning to the example of a 3×3 pattern, this means that one would be mapping nine image dots into this pattern.

Returning to the two sorts of patterns (clustered-dot and dispersed-dot) as is defined earlier, an effective mathematical algorithm may be derived that may be used to plot the correct pixel patterns. The two halftone (or dithering) matrices are needed:

$$\begin{pmatrix} 7 & 2 & 3 \\ 5 & 0 & 1 \\ 6 & 4 & 8 \end{pmatrix} \text{clustered-dot pattern}$$

$$\begin{pmatrix} 0 & 6 & 3 \\ 4 & 7 & 2 \\ 6 & 1 & 8 \end{pmatrix} \text{dispersed-dot pattern}$$

Halftone matrices are usually quadratic and only contain integer values in the range from 0 up to $n^2-1$ The value in the halftone matrix is used as a threshold. If the value of the original image dot (scaled into the 0-9 range) is less than the number in the corresponding cell of the matrix, the pixel is plotted black; otherwise it is plotted white. It is noted that in large areas of constant value, repetitions of the pattern are obtained just as in the patterning examples above.

As before, clustered patterns should be used for those printing devices which blur the pixels. In fact, the clustered-dot ordered dither is the process used by most newspapers.

As noted earlier, the dispersed-dot method (where the printing device allows) is preferred in order to decrease the graininess of the printed images. Bayer has shown that for matrices of orders which are powers of two there is an optimal pattern of dispersed-dots. The pattern for a 2×2 and 4×4 matrices are as follows:

$$\begin{pmatrix} 1 & 3 \\ 4 & 2 \end{pmatrix} \quad \begin{pmatrix} 1 & 9 & 3 & 11 \\ 13 & 5 & 15 & 7 \\ 4 & 12 & 2 & 10 \\ 16 & 8 & 14 & 6 \end{pmatrix}$$

Halftone matrices of higher order may be calculated by means of the following recursion:

$$D^{(2n)} = \begin{pmatrix} 4D^{(n)} + 3U^{(n)} & 4D^{(n)} + U^{(n)} \\ 4D^{(n)} & 4D^{(n)} + 2U^{(n)} \end{pmatrix}$$

whereby $U^{(n)}$ are matrices fully occupied by "1" entries.

These patterns (and their rotations and reflections) are optimal for a dispersed-dot ordered dither. The Bayer ordered dither matrix is in very common use and is easily identified by the cross-hatch pattern artifacts it produces in the resulting print-out. This artifacting is the major drawback of an otherwise powerful and fast technique.

Back in the analog days, continuous-tone values were converted to halftones in which the dots were of constant density and equally spaced, varying in size to produce the illusion of darker or lighter shades. To make a digital halftone, the printable dots are arranged into larger groups called halftone cells. The traditional analog halftone is simulated by turning dots on and off in a cell. This type of dither is also known as "AM (Amplitude Modulation) halftoning" or "conventional halftone". AM halftoning varies the size of the dots, but not their location. Darker areas have larger dots and lighter areas have smaller dots (or not dots). Because of the pattern generated with AM halftoning, undesirable artifacts may occur with multiple inks when their screens conflict with each other. Combating this necessitates rotating each inks' screen to avoid these conflicts. The clustered-dot ordered dither mentioned above is a digital implementation of AM halftoning.

ii) Stochastic Dithering

Stochastic (or random) dithering methods distribute the thresholds (e.g. 0 ... 255) randomly over the halftone matrix (which is then referred to as a "stochastic matrix"). This technique has two advantages. The expectation value of the total error is zero and no regular artificial pattern appears. On the other hand, due to the bad distribution of the random numbers the results may be rather weak. A lot of white-noise (see FIG. 13a) is generated. It should be mentioned that in stochastic dithering, dots are distributed in a truly random manner, whereas in blue-noise halftoning models (FM-halftoning) dots are distributed in a pseudo-random manner.

One possible way to improve this is to use a high resolution threshold matrix, where the threshold values are inserted one-by-one and always that position is used which experiences the lowest force from all the other thresholds already inserted. In order to determine the new location, a force field function is used, therefore this method is called forced random matrix dithering and belongs to the ordered dithering techniques mentioned under i).

In order to produce isotropic images, the force-field function should be radially symmetric. The function should also discourage additional threshold values from being placed close to already existing thresholds to avoid clustering. Therefore, the following function is chosen for generating the force-field of thresholds $$f(r) = \exp\left(-\left(\frac{r}{s}\right)^p\right)$$

where p is a parameter to control the steepness, s is a parameter to control deviation and r is the distance from the threshold value.

b) Neighborhood-Dependent dithering (Error Diffusion Dithering)

Error diffusion generates the best results of any of the digital halftoning methods described here. Error diffusion halftones also display a very pleasing randomness, without the visual sensation of rows and columns of dots; this effect is known as the "grid defiance illusion". However, error diffusion is the slowest method in digital halftoning.

Error diffusion may be described as follows. For each point in the image, the closest intensity (or color) available is found. Then the difference between the image value at that point and that nearest available intensity/color: this difference is the error value. The error value is divided up and distributed to some of the neighboring image areas which have not been visited (or processed) yet. When one gets to these later dots, the portions of error values which were distributed there from the preceding dots are added. This new, modified value now becomes the image value that is used for processing this point.

If one dithers grayscale image for output to a black-and-white device, the "find closest intensity/color" operation is just a simple thresholding (the closest intensity is going to be either black or white). In color imaging, this involves matching the input color to the closest available hardware color. Depending on how the printing device manages its intensity/color palette, this matching process may be a difficult task. It should be mentioned that until now, all other methods in digital halftoning were point operations, where any adjustments that were made to a given dot had no effect on any of the surrounding dots. With error diffusion, a "neighborhood" operation is performed. Dispersing the error value over a larger area is the key to the success of these methods. The different ways of dividing up the error may be expressed as patterns called filters. The first error diffusion filter was developed by Floyd and is Steinberg in 1975 and is therefore named "Floyd-Steinberg filter". Other error diffusion filters found in literature are Jarvis-Judice-Ninke filter, the Stucki filter, the Burkes filter, and the Sierra filter.

Error diffusion techniques belong to the category of FM-halftoning techniques, because the more dots that are printed within an area, the darker the image appears. The size of the dots is not varied, but the distances between the dots are.

In halftoning, blue-noise is the statistical model describing the ideal spatial and spectral characteristics of aperiodic dispersed-dot-dither patterns. The ideal blue-noise halftoning scheme produces stochastic dither patterns of the same-sized dots distributed as homogeneously as possible. By doing so, the spectral content of these patterns is composed entirely of high-frequency spectral components. The name "blue-noise" comes from the fact that the color blue is the high frequency (612-714 THz) component of visible white light. Given the low-pass nature of the human visual system, blue-noise creates visually appealing patterns simply because the spectral components of the pattern lie in the regions least visible to the human viewer. Furthermore, the stochastic distribution of dots creates a grid-defiance illusion where the structure of the underlying grid on which the pixels are aligned is no longer apparent to the viewer.

In comparison to clustered-dot halftoning schemes, blue-noise maximizes the apparent resolution of printed images, creating an image that lacks the visually disturbing texture created by large clusters arranged along a regular grid. But while isolating minority pixels makes them visible to the human eye, it also makes the patterns far more susceptible to printer distortion and the inability of some devices, such as laser printers, to reproduce dots consistently from dot to dot.

In the green-noise model, ideal patterns are composed of homogenously distributed pixel clusters that vary both their size and spacing for varying shades of gray. In the Fourier domain, green-noise patterns are composed almost exclusively of mid-frequency components, and as green is the mid-frequency component (522-612 THz) of visible white light, green-noise is the mid-frequency component to white-noise. In green-noise models, the dots are dispersed until a certain intensity is reached. For higher intensities, the individual dots are printed close to each other so that clusters are formed. This behavior may be obtained by appropriate halftone matrices.

Multi-Pass Printing

Multi-pass printing is very common in ink jet printers and is motivated by the following problems occurring in single-pass printing (see, for example, European Patent Application EP1382457 A1, par. [0007]-[0013]):

1. When the intrinsic resolution of the printhead is lower than the targeted printed image resolution, the printhead cannot print all dots during one pass. The image is thus written by "interlacing". This means that dot lines are printed along the direction of movement of the printhead in between the dot lines printed during a previous pass.

2. One general problem of page-wide printing is the formation of artifacts caused by the digital nature of the image representation and the use of equally spaced dots. One source of artifacts can be errors in the placing of printed dots caused by the variety of manufacturing defects such as (a) the location of the jet nozzles in the printhead or systematic errors in the movement of the printhead relative to the printing medium. In particular, if one jet nozzle is misplaced or its firing direction deviates from the intended direction, the resulting printing will show a defect which can run throughout the printing.

(b) Another problem in single-pass printing is based on the way the printing medium is advanced relative to the printhead. If the distance that the paper is fed after printing one swath does not fit with the height of the swaths printed, a systematic error is performed which may be visible. In other words, slip between the drive for the printing medium and the printing medium itself will introduce errors (paper advance problem).

Such errors may result in "banding", that is the distinct impression that the printing has been applied in a series of bands. The errors involved may be very small—the color discrimination, resolution and pattern recognition of the human eye are so well developed that it takes remarkably little for errors to become visible.

At least some of the errors problems mentioned above are overcome by printing one swath, then advancing the paper half the height of the swath and then printing over the lower half of the swath again. By doing this, the systematic error of the printer is distributed over the whole image, and is not visible anymore.

In the course of introducing multi-pass printing, it is reasonable to also employ a bi-directional printing mode. When the printing device has printed the first pass (for example, from left to right), it is useful, after the paper has been advanced, to print is the second pass (from right to left) instead of moving the printhead—without printing—to the left and then printing the second swath again from left to right. Bi-directional printing saves time and increases throughput of the printing device.

Since all embodiments of the invention refer to multi-pass printing, one should be aware of the fact that for each primary color, continuous-tone values are split into two (or more) pass values which are halftoned independently (the term of "independently halftoning" will be explained below), whereby the first pass value is represented when printing from left to right, and the second pass value is represented when printing right to left. Hence, all the dots of an image printed in the pass from left to right (first pass) form the first sub-image, and all the dots of the image printed in pass from right to left form the second sub-image.

To determine what is to be printed in the individual passes, the continuous-tone values (usually represented as pixelmaps) which are represented by means of a halftone method (matrix-based threshold procedure or error diffusion procedure) are split into individual pass values. A pass value, which is actually also a continuous-tone, is a part of the continuous-tone value that is printed in a respective pass. It should be mentioned that the term "continuous-tone value" as used herein refers to an original (unsplit) continuous-tone value provided in the image and not to a split continuous-tone value which is referred to as "pass value" herein.

Unfortunately, although multi-pass printing systems overcomes some of the problems encountered in single-pass printing, a graininess problem occurs which is caused by the three following reasons A-C:

A) Independent Halftone Matrices

One reason for graininess in highlight areas is based on independent/uncorrelated halftone matrices. Since the independent halftone matrices are not random, but exhibit a dispersed-dot pattern, printing a dispersed-dot pattern in each pass may result in areas with many dots (cluster), whereas in other areas only few dots are printed within an area which increases the impression of voids. This cause of graininess is a statistic effect which is only perceived in highlight areas. This effect also occurs in a hypothetical printing system. By using the same halftone matrix for printing in both directions, this cause of graininess could be reduced.

B) Different Sorts of Dots and Increase of Low Frequencies

A second reason for graininess is based on the fact that when splitting the continuous-tone value into two or more pass values, some dots are printed twice (in the pass from left to right, and in the pass from right to left), whereas other dots are printed only once. Since the dots which are printed twice are larger than the dots printed once, a graininess effect is introduced due to the two different "sorts" of dots perceived.

First and foremost, however, since some dots are printed twice, the amplitudes of these dots increase, whereas the (perceived) number of dots decreases, and the distances between the dots increases (on average) so that the low frequency parts of the power spectrum increase. This also results in the impression of graininess, and this cause of graininess is more pronounced when using the same halftone matrix for both printing directions, than when using independent halftone matrices since when using the same halftone matrix for both printing directions more dots are printed on top of each other than when using independent halftone matrices for the two passes.

This effect of graininess is primarily perceived in medium and dark areas, and only secondarily in highlight areas due to the smaller number of dots in highlight areas.

C) Mechanical Misalignment

A third reason for graininess is based on the fact that the printing device is not an ideal (hypothetical) device but a mechanical real-word entity. This means that misalignment problems occur if the printhead moves from right to left subsequent to moving left to right. This misalignment problem is a systematic error which is introduced by the play of the printhead when changing direction and is especially perceived by the human eye in areas with medium and high continuous-tone values (intensities). Thus, dots which are to be printed precisely on top of each other, are actually printed with a slight shift, so that the dots overlap or come to lie in a neighboring position. This means that the graininess effect described under B is even pronounced. This reason for graininess is caused by the printing device being a real, mechanical system which inevitably suffers from imperfections. The graininess effect due to mechanical misalignment is in principle present in highlight, in medium and in dark areas. Since, however, more dots are printed in medium and dark areas, this effect of graininess is primarily perceived there, whereas highlight areas are less affected. Graininess effect C, in contrast to cause A and B, is only encountered in a real-world setting and would not occur in a hypothetical perfect printing device.

Four Aspects of the Invention

It should be mentioned that all four aspects of the invention to be presented in the following may be equally employed for halftoning multi-color images (on the basis of cyan, magenta, yellow and black, which are the primary colors of subtractive color mixing) and for halftoning grayscale images.

In grayscale halftoning, a pixelmap (typically 8-bit values indicating an intensity) is given, which indicates a value between 0 and 255 that refers to the intensity of the pixel, a value of 0 refers to a white pixel, whereas an intensity of 255 refers to a black pixel. An intensity of 128 would consequently refer to a medium intensity.

In color halftoning, a pixelmap (e.g. 8-bit values indicating an intensity) is given for each of the primary colors cyan, magenta, yellow and black. Each pixelmap (color plane) is represented by halftoning it autonomously from the others, and the halftoning representations of each pixelmap are laid on top of each other. According to the theory of subtractive color mixing, dots of the primary colors are printed on top of each other to generate "intermediate colors". In color halftoning, however, the dots are mostly printed very close to each other. Thereby, since the dots are very small (seen from a distance), the same color impression occurs as if the dots were printed on top of each other. The final images are produced by overlaying component images in each of four printing inks, CMYK. To avoid moiré patterns, the clustered-dot screen for each of the component images are designed at different angles. The black screen, the most apparent color, is set at 45°, the least apparent color, yellow, is set at 0°, and cyan and magenta are set at ±15°. Typically, a halftone matrix has a plurality of threshold values of different value arranged in, for example, a pseudo-random order (in FM-halftoning) in two-dimensions. A complete image in 4 colors would have 32-bit resolution, that is to say 8 bits per pixel per color plane.

The aspects of the invention are directed to a printing system.

In some of the embodiments, the printing system comprises a computer, on which the functionalities described are entirely implemented, e.g. in the form of a printer driver. A printing device is then connected to the printing system.

In other embodiments, the printing system comprises a printing device, on which the invention is entirely implemented, e.g. in the form of hardware (a chip etc). The computer is then connected to the printing device.

In yet other embodiments, the term "printing system" refers to a printing device which is connected to a computer. The invention may then be implemented on both of them, a part on the computer, e.g. in the form of a printer driver, and a part in the printing device, e.g. as hardware.

When splitting the continuous-tone values into 50%-50% portions, and using the same halftone matrices to represent the pass values, two identical sub-images will come into being. The same occurs if the pass-values are represented using an error diffusion procedure as explained above. The reason for this is that exactly the same dots as are printed in the first pass will be printed in the second pass again.

U.S. Pat. No. 6,505,905 teaches that the continuous-tone values should be split in an asymmetrical way, namely e.g. 60%-40%. When applying an error diffusion to the individual pass-values, two independent sub-images will come into being. However, these independent sub-images exhibit the graininess effect in highlight areas mentioned under A.

It is now assumed to apply a split as that taught by U.S. Pat. No. 6,505,905 but to use matrix-based thresholding procedures instead of error diffusion methods. However, when applying the same halftone matrices for each sub-image two-thirds (statistically) of the dots which are printed in the first pass will be printed in the second pass again. Since the same matrix is used for both passes, the two sub-images are highly correlated. Since statistically two-thirds of the dots are printed on top of each other (or even worse, almost on top of each other), the undesired graininess effects mentioned under B and C is large, whereas the graininess effect referred to under A has been successfully suppressed. To improve this situation, the halftone matrices are made independent of each other by using for the pass from right to left the matrix used for the pass from left to right which is globally shifted, either vertically (column-wise) or horizontally (row-wise) by an offset value. "Globally" means that all matrix elements are shifted by the same offset-value.

1. Aspect of the Invention

Thus, according to embodiments of a first aspect of the invention, a multi-pass printing system is provided for printing an image, including a plurality of continuous-tone values, based on halftone matrices having threshold values. The printed image is composed of sub-images, each of which includes dots printed in a respective pass. The sub-images present independent dot patterns at corresponding places which are obtained by splitting the continuous-tone values into at least two pass values. An individual pass value indicates an intensity to be printed in a respective pass. In one pass, a first halftone matrix is used for printing the respective pass values. In another pass, one or more halftone matrices, obtained by positionally shifting the threshold values of the first halftone matrix, are used for printing all pass values of the other pass, or at least those pass values above a highlight threshold.

The "independent dot patterns" mentioned in the first aspect of the invention are achieved by generating "independent halftone matrices". A definition of independent halftone matrices is given in the context of the second aspect of the invention.

By doing this, the number of dots printed on top of each other (or near each other due to mechanical misalignment) is reduced, which means that the graininess effect due to cause B and C is reduced, whereas in return the graininess effect mentioned under A comes into being again. Fortunately, the graininess effect under A only appears in highlight regions so that a matrix shift is applied not globally but only for medium and dark continuous-tone values, whereas matrix-elements pertaining to highlight continuous-tone values are not shifted.

Therefore, in some of the embodiments of the first aspect of the invention, the first non-shifted halftone matrix is used for those pass values of the other pass where the pass value to be printed is below a highlight threshold. It should be mentioned that the matrix elements are usually shifted cyclically in diagonal direction (in x-direction and in y-direction). Thereby, highlight areas of the image are printed using dependent halftone matrices.

It should be mentioned that in some of the embodiments, the highlight threshold is 20% of the maximum intensity, whereas in other embodiments, the highlight threshold is 15% of the maximum intensity, and in yet other embodiments, the threshold is 10% of the maximum intensity.

In other embodiments, the matrix elements are shifted in x or in y direction.

In yet other embodiments, a set of second matrices is used. The different matrices of the set are obtained by different shifts. Using in another pass the second halftone matrices includes selecting for a pass value one of the set of second is halftone matrices depending on the intensity of the pass value.

Thereby, the graininess effect under A caused by the introduction of independent halftone matrices (which in turn where introduced to reduce the graininess effects B and C) is eliminated again.

2. Aspect of the Invention

Especially in highlight areas, the graininess remains so that the second aspect of the invention teaches that continuous-tone values should be printed above a highlight threshold in a first number of passes and that continuous-tone values below the highlight threshold should be printed in a second, smaller number of passes.

In some of the embodiments of the second aspect of the invention, a multi-pass printing system is provided for printing an image including a plurality of continuous-tone values to be printed as dot patterns. The printed image is composed of sub-images, each of which includes the dots printed in a respective pass. The sub-images are obtained by independently halftoning split continuous-tone values. The printing system is arranged to split the continuous-tone values such that if a continuous-value is greater than or equal to a highlight threshold, the continuous-tone value is split into a first number of pass values. Otherwise, the continuous-tone value is split into a second, smaller number of pass values. The continuous-tone values of the image are printed in the first and second numbers of pass values, respectively.

In some of the embodiments, the first number of pass values is two, and the second number of pass values is one. This means, that the continuous-tone value above the highlight threshold is printed in two passes, and the continuous-tone value below the highlight threshold is printed in one pass. Therefore, the expression "splitting the [ . . . ] second continuous-tone value" may not necessarily mean splitting into two or more pass values, but also expressly refers to splitting into one pass value, which means that the continuous-tone value is not actually split at all, and the (one and only) pass value and the continuous-tone value are identical.

Thus, the continuous-tone values above the highlight threshold are printed in two passes, whereas the continuous-tone values below the threshold are printed in one pass. The continuous-tone values below the threshold refer to highlight (=brighter) colors/gray-values, whereas the continuous-tone values above the is highlight threshold typically refer to medium and dark colors/gray-values. The impact of the second aspect of the invention is that graininess effects A, B, and C are thereby eradicated in highlight areas.

Incidentally, the term "splitting" as used in the context of the first aspect of the invention also includes the meaning that a continuous-tone value is divided into pass values and that a correction is applied to the pass values such that the sum of the pass values is, for example, greater than or equal to the continuous-tone value. Therefore, as will be explained in the context of the third aspect of the invention, splitting includes a correction for an overprint effect such that the sum of pass values corresponding to the continuous-tone value exceeds the (original) continuous-tone value.

It should be mentioned that "independently halftoning split continuous-tone values" does not only mean that the split continuous-tone values are further processed separately or autonomously, but also that the halftoning techniques applied result in independent dot patterns at corresponding places.

In some of the embodiments, independently halftoning split continuous-tone values refers to applying independent halftone matrices for different passes.

In some of the embodiments, two halftone matrices $$X = \begin{pmatrix} x_1 & x_2 & \ldots & \ldots \\ \ldots & & & \\ & & x_{n-2} & x_{n-1} & x_n \end{pmatrix} \quad Y = \begin{pmatrix} y_1 & y_2 & \ldots & \ldots \\ \ldots & & & \\ & & y_{n-2} & y_{n-1} & y_n \end{pmatrix}$$

are considered to be independent if their correlation coefficient (Bravais-Pearson) Cor(X,Y) is between −1 and 0.75, which is a rather weak condition concerning independency (In other words, only highly correlated matrices are considered to be dependent). If their correlation coefficient is in the interval between 0.75 and 1, they are regarded as dependent.

$$Cor(X, Y) = \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2} \cdot \sqrt{\frac{1}{n}\sum_{i=1}^{n}(y_i - \bar{y})^2}}$$

where $\bar{x} = \frac{1}{n} \cdot \sum_{i=1}^{n} x_i$ and $\bar{y} = \frac{1}{n} \cdot \sum_{i=1}^{n} y_i$ In other embodiments, independence of two matrices X,Y is assumed if their correlation coefficient is between −1 and 0.5, and in yet other embodiments, (partial) independence is assumed for a pair of matrices whose correlation coefficient is between −1 and 0.25.

The range of possible values of the correlation coefficient goes from −1 which refers to anti-correlation over 0 denoting no correlation to 1 which refers to total correlation. The coefficient of correlation is a dimensionless gauge for the degree of linear correlation between two at least interval-scaled attributes (here: the halftone matrices). If the correlation coefficient has the value 0, the two attributes are not at all linearly correlated. However, in spite of that, they may be correlated in a non-linear way.

It will be understood that when using independent halftone matrices, the dot patterns obtained will be independent by definition, although in cases of high intensities, the sub-images will inevitably reveal in fact dependent dot patterns due to the large number of dots that need to be printed. Therefore, the presence of independent dot patterns of sub-images at corresponding places may only be assessed in areas of low intensities. This is especially important for error diffusion techniques in which no halftone matrices may be analyzed for their correlation coefficient.

In some of the embodiments, independent halftone matrices are obtained by relatively shifting the threshold values (=matrix elements) of the halftone matrices to each other.

In other embodiments, independently halftoning split continuous-tone values refers to splitting the continuous-tone values into unequal portions and applying an error diffusion technique. In these embodiments, no halftone matrices are used, and the independence between the sub-images is obtained by splitting the continuous-tone values unequally (as discussed in U.S. Pat. No. 6,505,905). When the continuous-tone values are split into equal portions, and the same error diffusion technique is individually applied to each portion, the sub-images obtained will be identical and therefore fully dependent. The more unequal (60%-40%, 70%-30%, etc.) the split of the continuous-tone values is, the higher is the independency of the dot patterns obtained.

In other embodiments, independently halftoning split continuous-tone values refers to splitting the continuous-tone values into equal portions and applying different error diffusion techniques to the pass values.

In some of the embodiments, independent halftone matrices are obtained by globally shifting the matrix elements by a certain offset value, as described in the first aspect of the invention.

In other embodiments, independent halftone matrices are obtained by shifting matrix elements by an offset value which depends on the intensity level (continuous-tone value) of the image they are compared with.

It should be mentioned that independent dot patterns may be generated, in a general way, by using different halftone matrices for different passes. These matrices may also be of the same halftoning model, e.g. two (or more) different blue-noise halftone matrices, two (or more) different green-noise halftone matrices, or two (or more) different white-noise halftone matrices for different passes.

3. Aspect of the Invention

In some of the embodiments of a third aspect of the invention, a multi-pass printing system is provided for printing a continuous-tone value of an image including a plurality of continuous-tone values to be represented as dot patterns with intensities. The printed image is composed of sub-images, each of which includes the dots printed in a respective pass. The sub-images are obtained by independently halftoning split continuous-tone values. The printing system is arranged to split the continuous-tone value to be printed into at least two pass values. An individual pass value indicates an intensity to be printed in a respective pass, wherein the splitting comprises a correction for an overprint effect such that the sum of the pass values corresponding to the continuous-tone value exceeds the continuous-tone value. The continuous-tone value is printed in the number of passes with the respective intensities.

Density is the degree to which materials such as ink, paper and film absorb light. The more light one of these materials absorbs, the higher is its density. The corresponding devices which measure density are referred to as "densitometers". In fact, densitometers do not measure density but rather the ratio between the intensity ($I_0$) of light shone on or through a surface, and the light that reaches the detector ($I_1$) in the instrument. This ratio is called the reflectance (R) or the transmittance, depending on whether the instrument measures reflective materials such as ink and paper, or transmissive materials such as film.

Density is a logarithmic function. Density is computed from the measurement data using a logarithmic function, for several reasons. First, the human eye has a non-linear, logarithmic response to intensity, so a logarithmic density function correlates better to how brightness is perceived by the human eye. Second, it corresponds better (linearly) with the thickness (T) of materials like printing inks, which is one of the main functions of densitometers. When adding a second layer of ink, the density increases in the same amount as the thickness increases. When the layer of ink is doubled, the density also doubles. However, when one unit of length of ink is added, the reflectance decreases by the factor 10. This is represented in the following formula (cf. Beer-Lambert law).

$$T \sim D = -\log_{10} R = -\log_{10}\left(\frac{I_1}{I_0}\right)$$

Third, a logarithmic scale avoids long numbers when very dark materials are measured. In gray-scale halftoning, the illusion of a continuous gray value is created when black dots are printed next to each other and on top of each other. In color halftoning, the illusion of a continuous-tone color is created when dots of primary colors are printed next to each other and on top of each other. A density may therefore be assigned to black dots or dots of the primary colors (depending on the thickness of the ink layer making up the dots). Moreover, a (halftone or integral) density may be assigned to a small unit area in which the illusion of a continuous-tone (gray-scale or color) appears by averaging the densities of the individual dots in the unit area.

As noted above, when the halftone values are split in a relationship 60%-40% and the same halftone matrix is used for both direction or an error diffusion is applied, some of the dots are printed twice (in the first and second pass), whereas other dots are not printed in either of the passes. In the example given, statistically two-thirds of the dots printed in the first pass will be printed in the second pass again. If one printed the entire continuous-tone value (100%) in one pass, then no dot would be printed twice, but instead further dots would be printed. When a dot is printed for the first time on a white area, the density in this area increases. When a second dot is printed next to the first dot, the density in this area increases to a larger extent as if the second dot were printed on top of the first dot. Due to the logarithmic behavior of thickness/density against reflectance, two dots which are printed next to each provide a larger average density than two dots printed on top of each other. Therefore, in single-pass printing, higher densities may be obtained than in multi-pass printing. To compensate for this loss of density, the continuous-tone values to be printed are split into a number of pass values which refer to the intensity/amount of ink which is to be printed in an individual pass. The sum of the individual pass values pertaining to a continuous-tone value exceeds the continuous-tone value such that the loss of density is compensated. For example in three-pass printing, a continuous-tone value of 80% may be split into the three pass values (27%, 28%, 34%) yielding a sum of 89%, i.e. a surplus of 9% which is raised to compensate for the loss of density associated with multi-pass printing.

In some of the embodiments, the independent halftoning of split continuous-tone values includes using independent halftone matrices for different passes.

In other embodiments, using independent halftone matrices includes using halftone matrices which are relatively shifted to each other.

In some of the embodiments, the non-shifted matrix is used for those pass values that are below a highlight threshold.

In some of the embodiments, halftoning split continuous-tone values includes splitting the continuous-tone values into unequal portions and using an error diffusion to represent them. If the portions are unequal, independent sub-images are obtained when the same type of error diffusion is used in the different passes.

In other embodiments, in combination with the first aspect of the invention, halftoning split continuous-tone values includes using a halftone matrix for one pass, and the shifted (independent) halftone matrix for another pass.

In some of the embodiments, also in combination with the first aspect of the invention, if the pass values corresponding to the continuous-tone value are below a highlight threshold, the pass values are compared with the same matrix threshold in the different passes. However, if the pass values corresponding to the continuous-tone value are of medium or high intensity, the pass values are compared with different matrix thresholds in the different passes. The matrix thresholds are determined by shifting a halftone matrix. In these embodiments, in addition to the compensation for a loss of density, graininess effects are reduced.

In combination with the second aspect of the invention, halftoning split continuous-tone values includes leaving continuous-tone values below a highlight threshold unsplit (=are "split" into one pass value), or splitting them into a smaller number to reduce graininess in highlight areas.

4. Aspect of the Invention

As mentioned in the context of the second aspect of the invention, independent halftone matrices may be obtained by using different matrices (which are obtained, for example, by shifting the matrix). The different matrices may, of course be, of the same halftoning model, e.g. both matrices are dispersed-dot matrices. The following aspect of the invention now refers to the way independent dot patterns are obtained by using different halftoning models for different passes.

According to a fourth aspect of the invention, a multi-pass printing system is provided for printing an image defined by continuous-tone values to be printed as dot patterns. The printed image is composed of sub-images, each of which includes the dots printed in a corresponding pass. The sub-images present independent dot patterns at corresponding places which are obtained by splitting the continuous-tone values into at least two pass values. At least two different halftoning models are used in different passes to print the respective pass values.

In some of the embodiments, the different halftoning models are selected from a group including a blue-noise halftoning model, a green-noise halftoning model, and a white-noise halftoning model.

It should be mentioned that in the context of this aspect of the invention, different halftoning models are not obtained by applying different error diffusion weightings for the different passes, as described in U.S. Pat. No. 6,505,905, col. 11, line 36-45. Error diffusion techniques using different weightings would all pertain to the blue-noise error diffusion models, and therefore would not be considered as different.

In other embodiments, at least one of the different halftoning models is implemented using a halftone matrix.

A blue-noise halftoning model includes dispersed-dot halftone matrices, a green-noise halftoning model includes clustered-dot halftone matrices, and a white-noise halftoning model includes stochastic matrices.

In some of the embodiments, a blue-noise halftoning model is implemented using an error diffusion.

In some of the embodiments, the splitting of the continuous-tone values into at least two pass values includes splitting the continuous-tone values into a number of equally portioned pass values, and wherein different types of error diffusion are used for the different passes which use a blue-noise halftoning model.

In other embodiments, the splitting of the continuous-tone values into at least two pass values includes splitting the continuous-tone values into a number of unequally portioned pass values, and wherein the same type of error diffusion is used for the different passes using a blue-noise halftoning model.

Different types of error diffusion are the Floyd-Steinberg filter, the Jarvis, Judice and Ninke filter, the Stucki filter, the Burkes filter, and the Sierrra filters.

FIG. 1: Bi-Directional Inkjet Color Printer

Returning now to FIG. 1 which shows a bi-directional inkjet color printer 1 which includes processing circuitry for performing all or part of the multi-pass printing techniques described herein. The color inkjet printer includes a cover 2, a paper tray 3 for holding virgin paper (printing medium) 4, an output tray 5 for receiving the printed pages, four color ink print cartridges 6, and a scanning carriage 7 for sliding along a slide bar 8 while dots are being printed on the paper by a printhead 9. The color print cartridges 6 include the inks of the primary colors of subtractive color mixing, namely cyan, magenta, yellow, and additionally black ink. The dots are obtained by nozzles 10 of the printhead 9 which spray droplets onto the printing medium while moving across the printing medium.

Since the printer 1 is a bi-directional inkjet printer, it is ideal for multi-pass printing. (As mentioned above, the expression "multi-pass" means that a continuous-tone value is represented by the printhead 9 moving several times across the printing medium 4, while spraying drops of ink onto the same places, whereas "bi-directional" refers to the fact that the printer 1 is able to print in both directions, i.e. when moving from left to right and from right to left. Thus, there is no time wasted on a carriage return, so that throughput is increased. Uni-directional printing prints in one direction, with no printing taking place during the return of the scanning carriage 7.)

The printhead 9 prints a first swath when moving from left to right, then the printing medium 4 is advanced by a paper advance mechanism 11 one-half of the swath height (typically between 7.62 and 25.40 mm) and the printhead 9 prints a second swath (return swath) when moving from right to left. This practice of two-pass printing helps to reduce banding effects due to misdirected or missing nozzles typically encountered in single-pass printing.

The printer 1 suffers from a systematic misalignment problem (which is inherent to most (if not all) mechanical printing systems) when it changes direction from printing a first pass, from left to right, to a second pass from right to left (bi-directional misalignment problem). This misalignment leads to drop placement errors which may cause a significant decrease in the quality of halftone images.

Furthermore, errors in drop placement may be the result of a range of causes, such as: carriage vibration, paper advance errors, printhead misdirecting drops and paper deformations. Such errors disrupt the precise placement of drops giving rise to noticeable undesired patterns. The decrease in image quality is particularly noticeable if the drop placement errors are caused by a systematic printer error, such as a print carriage vibration of a paper advance error, which tend to produce a very noticeable undesired pattern in the halftone image.

Some of the systematic errors could be overcome by only printing in one direction, however bi-directional printing—in comparison to uni-directional printing—is, of course, highly desirable in order to increase throughput.

Figure 2:
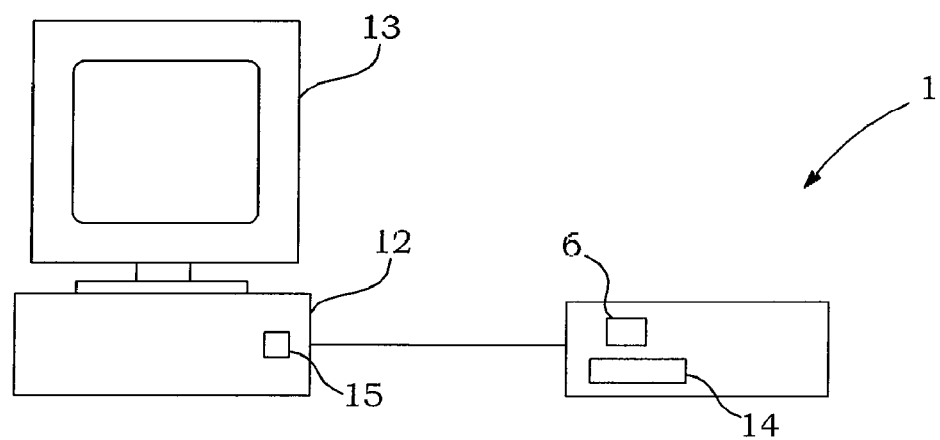
FIG. 2 illustrates a printing system including the inkjet printer of FIG. 1 which incorporates the present invention.

FIG. 2: Printing System

Figure 3:
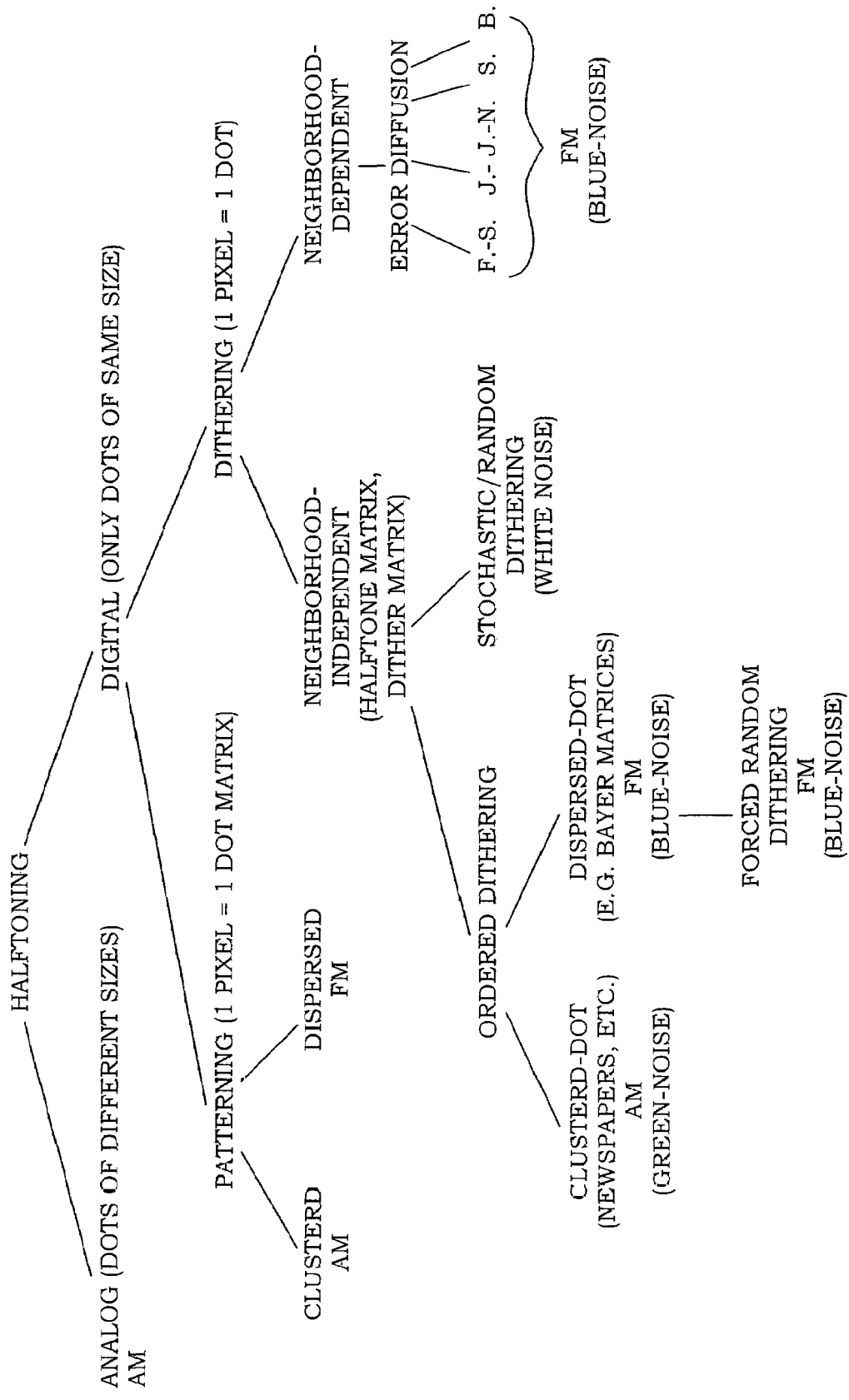
FIG. 3 shows an overview of terms used in the context of the invention.

FIG. 3 is a schematic diagram of a printing system, according to the different aspects of the invention, which includes a host computer 10, a monitor 13 (e.g. a CRT), and the color inkjet printer 1 of FIG. 1. The printer 1 has color print cartridges 6 which scan across a medium and print dots of color ink as described below. The printer 1 includes a printer controller 14 which receives coded signals from computer 12 and provides firing signals to the print cartridges 6 to print color dots. The print cartridges 6 may print at 300 dots-per-inch (dpi), 600 dpi, or any other resolution.

The functionalities described herein for multi-pass printing may be implemented using a combination of hardware and software, whereby portions of the hardware/software are incorporated in the computer 12 as software, for example, in the form of a printer driver 15, and other portions are located in color inkjet printer 1 in the form of hardware, such as the printer controller 14, for example, a PAL, PLA or FPGA. In other words, the invention may be implemented (a) solely as software on the computer 12, or (b) solely on the printer 1 as hardware, e.g. in the form of an intelligent printer controller 14. Alternatively, the invention may be implemented (c) partly on the computer 12 and partly on the printer 1. The location of the hardware/software for carrying out the different aspects of the invention is a matter of design choice.

FIG. 3: Overview of Terms Used

FIG. 3 illustrates the relationships of terms used in the context of halftoning which have been introduced in the introductory part of the description. Halftoning may be divided into analog and digital halftoning. Around 1850, the feasibility of a process for printing continuous-tone images was demonstrated by photographing an image through a loosely woven fabric or "screen" placed some distance from the focal plane. It is this process that gave the word "halftone". It came into practical use in the 1890's when the halftone screen became commercially available, consisting of two ruled glass plates cemented together. In the 1940's the contact screen, a film bearing a properly exposed light distribution of a conventional screen, was introduced. Analog halftoning, also referred to as amplitude modulation (AM), refers to printed dots of different sizes whereby the distance between the centers of the dots is constant. Nowadays, in digital halftoning, the different sized dots are emulated by amalgamating same-sized dots to clusters.

Digital halftoning may be divided into patterning, where a halftone (e.g. 8-bit pixel value) is presented by means of a dot matrix, and dithering, in which a matrix is superposed on a set of (8-bit pixel values) and for each pixel value, a dot is set or not depending on whether the pixel value exceeds the matrix threshold or not. Patterning may be implemented using clustered pattern (AM) or a dispersed pattern (FM). Dithering may be divided into neighborhood-independent procedures which are also referred to as halftone matrix (=dither matrix) based techniques, and neighborhood-dependent procedures which are also referred to as error diffusion techniques. Error diffusion is a frequency-modulation halftoning procedure and belongs to the blue-noise halftoning models.

Neighborhood-independent dithering may be divided into ordered dithering and stochastic/random dithering (white noise). In ordered dithering the places of thresholds is determined such that the patterns formed refer either to a cluster of dots (emulating dots with different amplitudes) which is referred to as AM-halftoning or green-noise halftoning models or to a dispersed-dot pattern (in which similar thresholds have large distances, e.g. Bayer matrices, see above). Dispersed-dot patterns refer to FM-halftoning (blue-noise halftoning models). Another blue-noise halftoning model is forced random dithering which was explained above.

Figure 4:
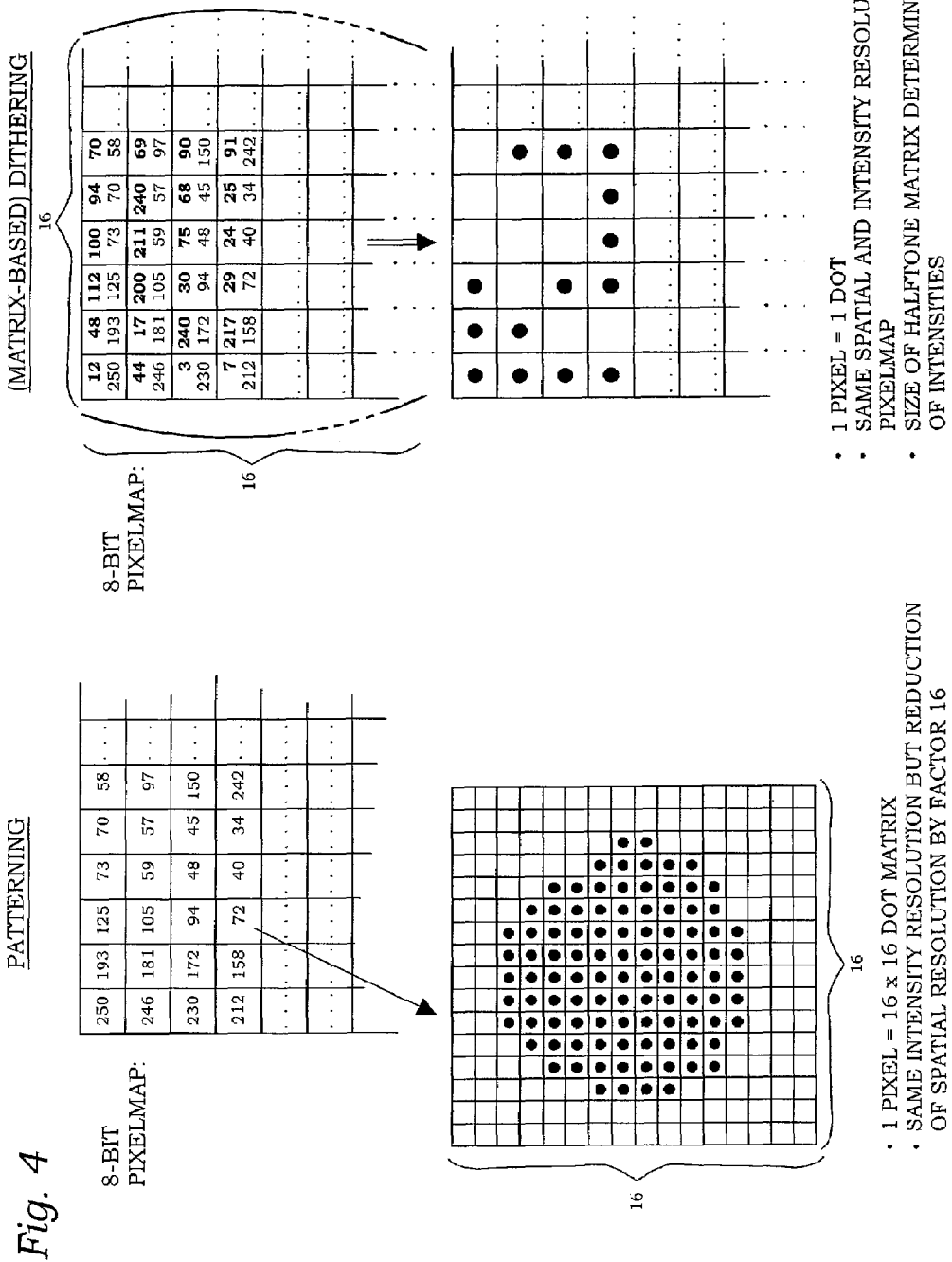
FIG. 4 shows the difference between patterning and dithering.

FIG. 4: Difference Between Patterning and Dithering

FIG. 4 refers to the difference between patterning (=a first approach in digital halftoning) and dithering. On the left side, an original image which is to be reproduced is given by means of an 8-bit pixelmap, whereby each 8-bit value refers to a continuous-tone value (halftone). In the example, each individual value corresponds to a pixel and refers to a halftone gray value ranging from 0 (=white) to 255 (=black). (In the case of color images, a pixelmap would be needed for each individual primary color.) If this pixelmap is to be represented by means of patterning without any loss of gray tone resolution, then each of the gray values needs to be represented by means of a 16×16 bitmap (dot matrix in which a certain number of matrix elements are filled with dots). In the example, the intensity value "72" is represented as a bitmap, in which 72 of the 256 matrix elements are filled with a dot. In the example, the dots are arranged in a cluster growing outward from the center which refers to the digital implementation of an amplitude modulation (AM) halftoning method. Instead of printing a genuine halftone dot having the gray intensity of 72 (which the printing device is, of course, unable to do), the printing device prints 72 dots into a 16×16 halftone raster which reduces the spatial resolution by the factor 16. If, in contrast, the spatial resolution of the image is to be preserved, then a loss of intensity resolution has to be accepted. In patterning, a distinction between a pixel and the dots to be printed is made. Thus, the disadvantage of patterning is the loss of spatial resolution, making it acceptable only if the resolution of the image is lower than the resolution of the printing device.

On the right side, the same 8-bit pixelmap is provided. Now, however, a 16×16 halftone matrix having threshold values from 0 to 255 is superposed on the pixelmap. The continuous-tone values are compared with the threshold of the matrix. If the continuous-tone value is greater than the corresponding threshold, then a dot is printed at that location. If the continuous-tone value is below the threshold, then no dot is printed. In the example (which only shows the upper left corner of the halftone matrix), again a clustered-dot halftone matrix is used which results in the digital representation of an amplitude-modulation halftoning technique. Since each pixel leads to a dot (or not, if the threshold is not exceeded), the bitmap obtained by dithering has the same spatial and intensity resolution as the pixelmap. A halftone matrix is therefore able to recognize the overall (average) intensity of that part of the image on which it is superposed and transforms into a binary dot pattern having on average the same intensity. The binary dot pattern may be a dispersed-dot pattern (blue-noise, FM-haltoning) or a clustered-dot pattern (green-noise, AM-halftoning) simulating an analog halftoning technique.

Furthermore, the size of the halftone matrix determines the number of intensities which may be provided. Dithering means, that the information of a part of an image made up of continuous-tone values on which a halftone matrix is superposed is represented as a binary dot pattern in which the dots may be dispersed but—seen from a distance—represent on average the information of the continuous-tone image.

Figure 5:
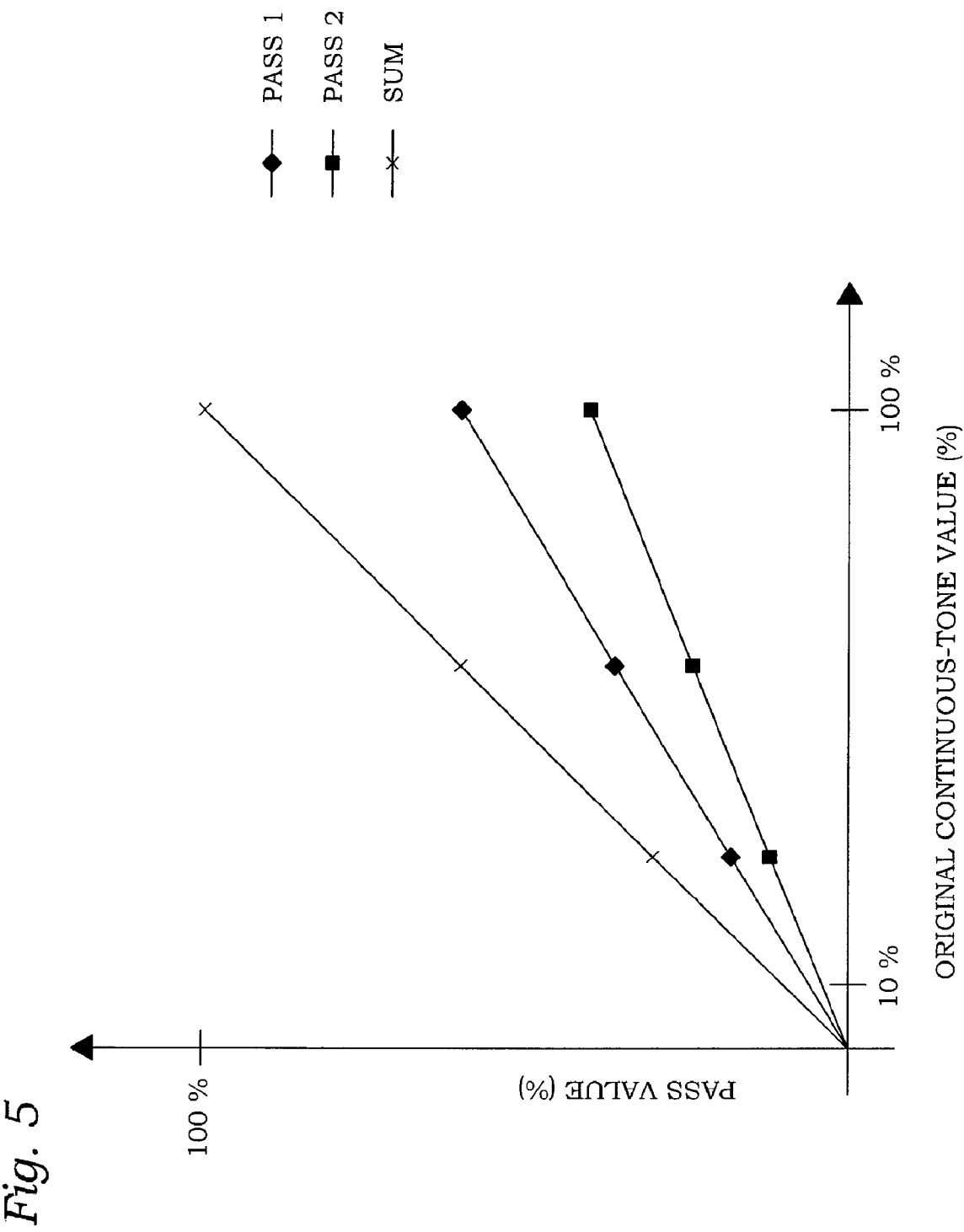
FIG. 5 shows a split curve for multi-pass printing splitting all continuous-tone values into a 60%-40% proportion.

FIG. 5: Split Curve for Multi-Pass Printing

While the figures presented so far only refer to single-pass printing, FIG. 5 now refers to a split curve which indicates how continuous-tone values are split into two portions, whereby the first portion is printed when the printhead moves from left to right, and the second portion is printed when the printhead moves from right to left. As can be seen from the diagram, all continuous-tone values are split into a 60%-40% proportion, which means that 60% are printed in the first, and 40% of the values are printed in the second pass.

FIG. 6: Application of a Split Curve to a Continuous-Tone Value Image

FIG. 6 shows the application of the split curve of FIG. 5 to an image of continuous-tone values. The 8-bit pixelmap containing the 100% continuous-tone value refers, in this example, to a grayscale color map indicating the intensities of the gray image to be printed. In the case of the color inkjet printer 1 it could represent an 8-bit cyan color pixelmap, which when represented as halftone and printed on top of a halftoned magenta, yellow and black pixelmap could represent a halftoned color image. In color images, the different color bitmaps (=halftoned pixelmaps) should be rotated by a certain angle to avoid moiré-effects.

The 100% continuous-tone values are split into 60%-pass values which are shown in the left pixelmap, and 40%-pass values which are indicated in the right pixelmap. This splitting of the continuous-tone value may be understood as a preprocessing step which is necessary in two-pass printing. It should be mentioned that the instruction to multiply each 100% continuous-tone value by 0.6 to obtain the 60%-pass value and to multiply each 100% continuous-tone value by 0.4 to obtain the 40%-pass value may also be represented in the form of (one or) two "printing mask(s)". The sub-image defined by the 60%-pass values will be printed in the first pass (from left to right), while the sub-image defined by the 40%-pass values will be printed in the second pass (from right to left).

Figure 7A:
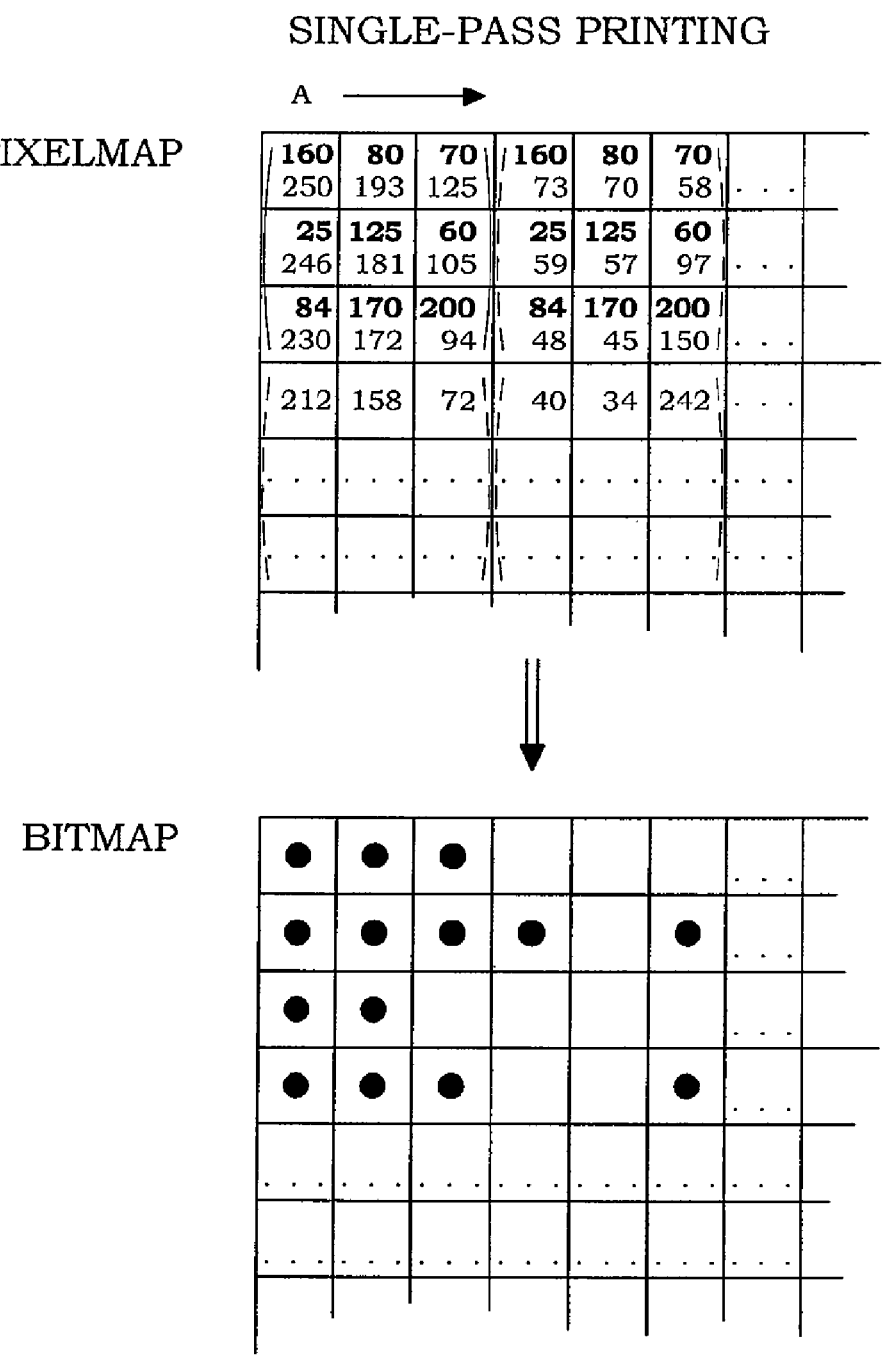
FIG. 7a shows a dot distribution obtained in single-pass printing.

FIG. 7a: Single-Pass Printing

FIG. 7a shows a distribution of dots when using a halftone matrix in single-pass printing. The original continuous-tone values remain 'unsplit', and a halftone matrix A is shifted over the continuous-tone values of the 100% pixelmap values. Starting in the upper left corner, the thresholds of the halftone matrix A are compared with the continuous-tone values, and if a continuous-tone value exceeds the threshold, a dot will be printed at that place. After the upper left 3×3 square of the pixelmap has been processed with the 3×3 halftone matrix, the halftone matrix is shifted by three positions to the right. (It should be mentioned that halftone matrices are usually much larger. In FM-halftoning, a halftone matrix includes at least 256 matrix elements, whereas in AM-halftoning, a halftone includes at least 30 to 40 matrix elements.) After the first three rows of the pixelmap have been processed, the next three rows of the pixelmap will be processed. The bitmap obtained when using this procedure is shown below the 100% pixelmap. The halftone matrix is tiled across the image, which is typically larger than the halftone matrix, so that every threshold value is aligned with one pixel value. Tiling the halftone matrix enables a halftone matrix to be used which is smaller than an image size. All 14 dots (of the 4×6 rectangle considered) which have been printed have the same size, and the distances between the dots are rather low in comparison to the dot distribution shown in FIG. 7b.

Single-pass printing, as used, herein means depositing a swath of ink droplets across the print medium as the ink expelling printhead is moved relative to the medium. The medium is advanced a distance approximately equal to the printed swath and the printhead is again traversed across the medium expelling ink droplets in another swath on the medium. The printed swaths are arranged adjacent to each other such that no meaningful overlap of deposited droplets occurs between the swaths.

FIG. 7b: Using the Same Halftone Matrix for Two Passes

FIG. 7b illustrates the two pixelmaps which are obtained when splitting the original continuous-tone values are split according to a 60%-40% proportion which may be used for two-pass printing. A 3×3 matrix A is superposed on the 60%-values. If a 60%-value exceeds the threshold, a dot is printed at that place, otherwise no dot is printed. After the nine 60%-values in the upper left corner of the image have been processed, the matrix A is shifted to the next 3×3 60%-pixels (which is indicated by dotted brackets). After the first three rows of the pixelmap have been processed, the next three lines will be processed. (Incidentally, since the usage of threshold-based halftone matrices is neighborhood-independent, this procedure may also be parallelized.) The dots to be printed in the first pass are the result of the processing. This bitmap is shown below the pixelmap. In the first row, the second and third 60%-pass values have exceeded the threshold, so that two dots will be printed on these places.

For the second pass, the 40%-pass values shown in the pixelmap on the right side are processed in the same way, and another bitmap is generated which is shown below the 40%-pixelmap. It will be understood that the dots generated in the second pass are a subset of the dots printed in the first pass. Statistically, one may assume that ⅔ of the dots which are printed in the first pass, are printed in the second pass again. In the middle below the two bitmaps, the total distribution of dots is shown which is the result of the two-pass printing. In total, eight dots (of the 4×6) have been printed, whereby three of the dots have been printed in the first and the second pass. These three dots have a larger amplitude than the other five dots which have only been printed in the first pass. (Actually, the dots which are printed in both passes do not form a dot with a larger radius, but lie next to each other in the form of a "horizontal eight".) In comparison to FIG. 7a, the distances between the individual dots are larger since there are fewer dots. This corresponds to an image with long wavelengths which corresponds in turn to an increase in the power spectrum in low frequencies which enhances the impression of graininess. This is also the reason for the fact that white-noise halftoning models are less favorable than blue-noise halftoning models. This effect of graininess has been elucidated above and was denoted as effect B.

It should be mentioned that due to systematic errors of the inkjet printer, it may be impossible to print dots exactly on top of each other, but with a slight shift. This further enhances the effect of graininess which has been explained in the introductory part of the description under graininess effect C.

Figure 8:
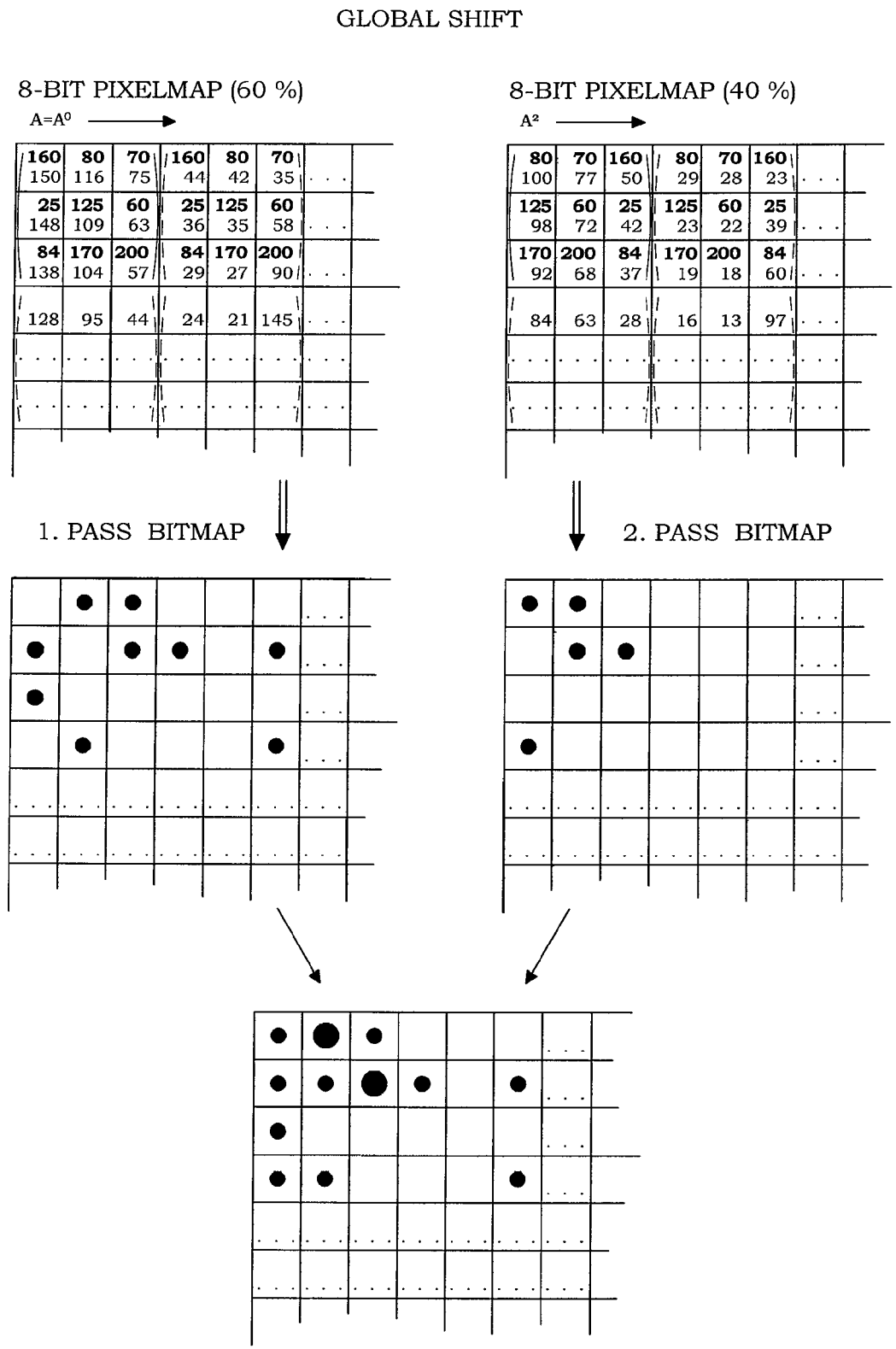
FIG. 8 shows the application of a global shift to a halftone matrix, according to embodiments of a first aspect of the invention.

FIG. 8: Global Shift (Embodiment of the First Aspect of the Invention)

FIG. 8 illustrates a method of generating independent sub-images by globally shifting the matrix elements of a halftone matrix by a certain offset value. On the left side of FIG. 8, the 3×3 halftone matrix A is applied to the 60%-pixelmap and is processed in the same way as described in FIG. 7b. However, the processing of the 40%-pixelmap differs in that a matrix $A^2$ is used which has been obtained from A ($A^0$) by cyclically shifting the columns of matrix A by an offset of two, which means that the first column of matrix A becomes the third column of matrix $A^2$, the second column of matrix A becomes the first column of matrix $A^2$, and the third column of matrix A becomes the second column of matrix $A^2$. This matrix $A^2$ is now used for representing the 40%-pixelmap. As can be seen from the bitmap on the right side, five dots instead of three dots (FIG. 7b) are now printed in the second pass. In total, 12 dots are printed, whereby two of these dots are "double-dots" which come into being by printing a dot in the first pass and again in the second pass.

It will be understood that in this approach, the dots printed in the second pass are no longer a subset of the dots printed in the first pass, since the two halftone matrices used are not the same. This means that the sub-images obtained are independent, and no percentage can be given which indicates which fraction of the dots printed in the first pass will be printed in the second pass again. This is different from the approach shown in FIG. 7b, in which statistically two-thirds of the dots printed in the first pass will be printed in the second pass again.

While the graininess effect mentioned under B and C in the introductory part of the description will be reduced by the approach shown in FIG. 8, the graininess effect in highlight areas (referred to as effect A) will be enhanced.

Figure 9:
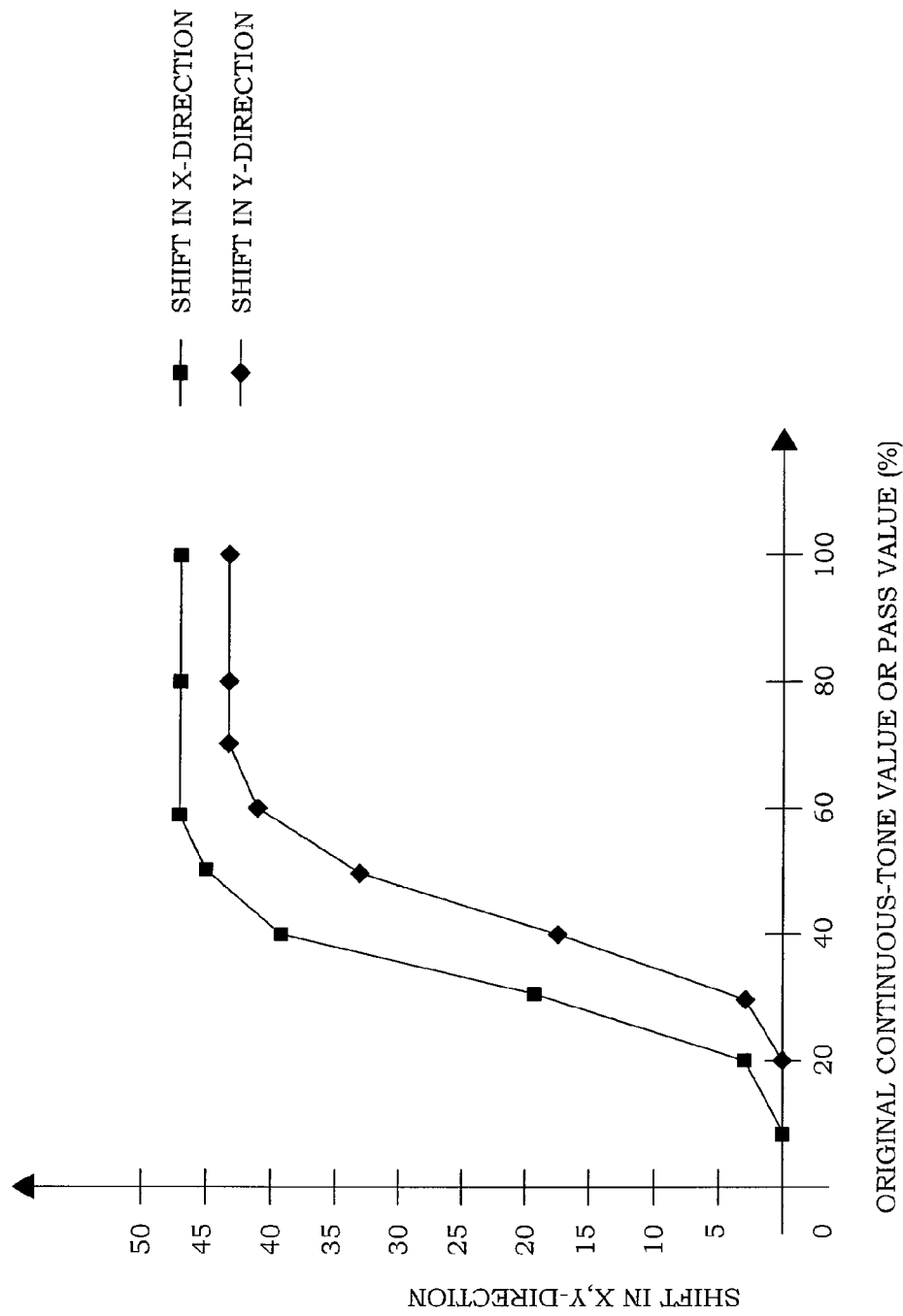
FIG. 9 shows a schematic illustration of a curve indicating the shift of matrix elements according to the intensity of pixel values, according to embodiments of the first aspect of the invention.

It should be mentioned that the continuous-tone values could also be split into a 50%-50% proportion, whereas in the embodiments shown in FIG. 7b (same matrix for both passes), splitting into 50%-50% would result in full overprinting FIG. 9: Adaptive Shift (Embodiment of the First Aspect of the Invention)

FIG. 9 shows an example in which the graininess effect mentioned under A, which is a problem in the embodiment of FIG. 8 due to the independent halftone matrices A and $A^2$, is overcome. It has been observed that the graininess effect B and C is especially disturbing in areas of higher intensities and may be overcome by using different (independent) matrices for different passes. To overcome the graininess effect A, which only appears in highlight areas, it is desirable to use the same matrix for both passes. Thus, the example shown in FIG. 9 proposes a shift of the matrix elements dependent on the intensity values. For each pass-value of the second pass, it is ascertained whether it is a low intensity value or a higher intensity value. In the case of a low intensity pass value, the same threshold which has been used for the first pass value will be used for the second pass value again. In the case of a high intensity pass value, the matrix will by shifted by a certain offset value in x and y direction (diagonal direction), and the intensity pass value will be compared to the corresponding threshold value of the matrix.

FIG. 9 shows two functions which indicate the offset of the shift in x and y direction of the matrix against the intensity of original continuous-tone value or a pass value. By applying the two functions, pass values of the second pass having less than 10% of intensity are compared with the thresholds of the halftone matrix which was used for representing the first pass values (resulting in correlated sub-images in highlight areas), whereas pass values of the second pass having an intensity of 60% are compared with thresholds of a matrix which has been shifted by an offset of 42 matrix positions in y-direction and by an offset of 46 matrix positions in x-direction with respect to the matrix used for representing the pass values of the first pass.

FIG. 10: Application of an Adaptive Shift Method to an Image (Embodiment of the First Aspect of the Invention)

FIG. 10 illustrates the application of the adaptive shift defined in FIG. 9 to an image. The continuous-tone values of the image are split into two parts. It should be mentioned that while FIG. 9 refers to shifting the halftone matrix in diagonal direction by shifting the halftone matrix in x- and y-direction, FIG. 10 only shows—for the sake of simplicity—shifts of the matrix in x-direction. The left side of FIG. 10 shows the pixelmap pertaining to the 60% portion of the original image pixelmap, whereas the right side of FIG. 10 shows the 40% portion of the original image pixelmap. In the example, an ordered halftone matrix is superposed on the 60%-pixelmap. This halftone matrix is denoted as $M=M^0$ and has 256 columns and 256 rows. Its elements are denoted as $m_{i,j}$, whereby the indices i and j indicate the row and column of this element. The superior index 0 indicates that the matrix has not been shifted. This is matrix may also be represented in form of its column-vectors which are denoted as $$\vec{a_1}, \ldots, \vec{a_{256}}.$$

A matrix $M^x$ is obtained by shifting the matrix elements column-wise by an offset x. Thus, $M^1$ denotes the matrix $$(\vec{a_{256}}, \vec{a_1}, \ldots, \vec{a_{255}}),$$

and, for example, $M^{50}$ refers to the matrix $$(\vec{a_{207}}, \vec{a_{208}}, \ldots, \vec{a_{256}}, \vec{a_1}, \ldots, \vec{a_{206}}).$$

On the left side of FIG. 10, the halftone matrix M is superposed on the 60% pass values of the image, and the 256×256 pass values are processed by comparing them with the individual threshold values of the matrix M. The right side of FIG. 10 shows the processing of the 40% pass values pertaining to the second pass.

For each individual pass value, a shift value (offset value) x is retrieved from one of the functions 1 or 2 shown in FIG. 9, and the 40%-pass value is compared with the threshold value of the halftone matrix $m^x$ at the corresponding position. For example, the pass value "100" having an intensity of 98% (40%*255=102=100%) is compared with the entry $M_{1,1}^{49}$ of the matrix $M^{49}$. In contrast, the pass value "19" at position (3,4) having an intensity of less than 20% is compared with the threshold $m_{3,4}^0 = m_{3,4}$, i.e. with an element of the matrix M which was used for representing the pass values of the first pass.

By using the adaptive shift method shown in FIG. 10, the graininess effects A, B and C may be overcome.

Here again, it is not necessary to split them into unequal portions (60%-40%) in order to obtain a satisfying result.

Figure 11A:
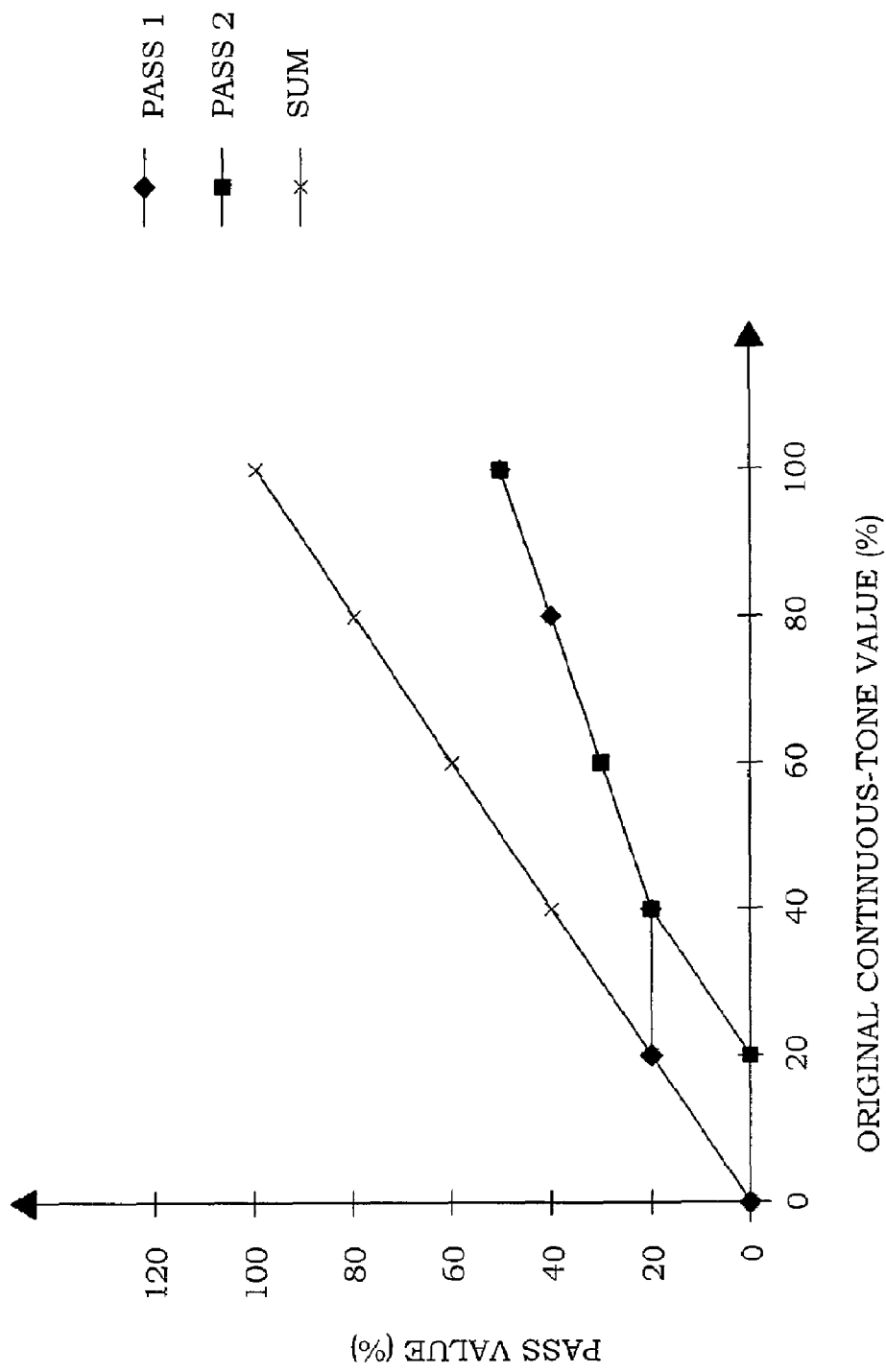
FIG. 11a shows a two-pass split curve according to embodiments of a second aspect of the invention.

FIG. 11*a*: Two-Pass Split Curve for Preventing Graininess in Highlight Areas (Embodiment of the Second Aspect of the Invention)

FIG. 11*a* refers to an alternative approach to that shown in FIG. 10. A split curve for two-pass printing is shown, in which continuous-tone values below an intensity of 20% remain 'unsplit', which means that they are entirely printed in the first pass. Two independent halftone matrices are used for the two passes in order to generate independent sub-images. (These independent halftone matrices could be obtained by applying the global shift method shown in FIG. 8.) Thereby, the graininess effect B due to overprinting (or printing almost on top of each other) and the graininess effect C due to mechanical misalignment problems which both play an important role in areas of high intensity are overcome, and additionally the graininess effect A (occurring in highlight areas) is also overcome.

The x-axis indicates the intensity of a continuous-tone value on a range from 0% to 100%. The y-axis indicates how the individual continuous-tone values are split into pass values. To avoid graininess in the highlight areas of the image, the continuous-tone values below 20% are printed in one pass (here: in the first pass), whereas continuous-tone values above 20% are split into two pass values. In the range between 20% and 40%, the first pass value is 20%, and the second pass value is the difference between the continuous-tone value and 20%. In the range above 40%, the continuous-tone values are equally split into two pass values. A third line (the identical straight line) indicates that all continuous-tone values are split into corresponding pass values such that the sum of these pass values is equal to the continuous-tone value.

It should be mentioned that this approach—in contrast to the adaptive shift approach shown in FIGS. 9 and 10—guarantees that all three graininess effects (A, B and C) are rigorously eliminated in highlight areas, since highlight areas are only printed in one pass, whereas in the case of the adaptive shift approach, all three causes of graininess may be present (even though effect A is present to a reduced extent, and effects B and C are only of minor influence in highlight areas).

Figure 11B:
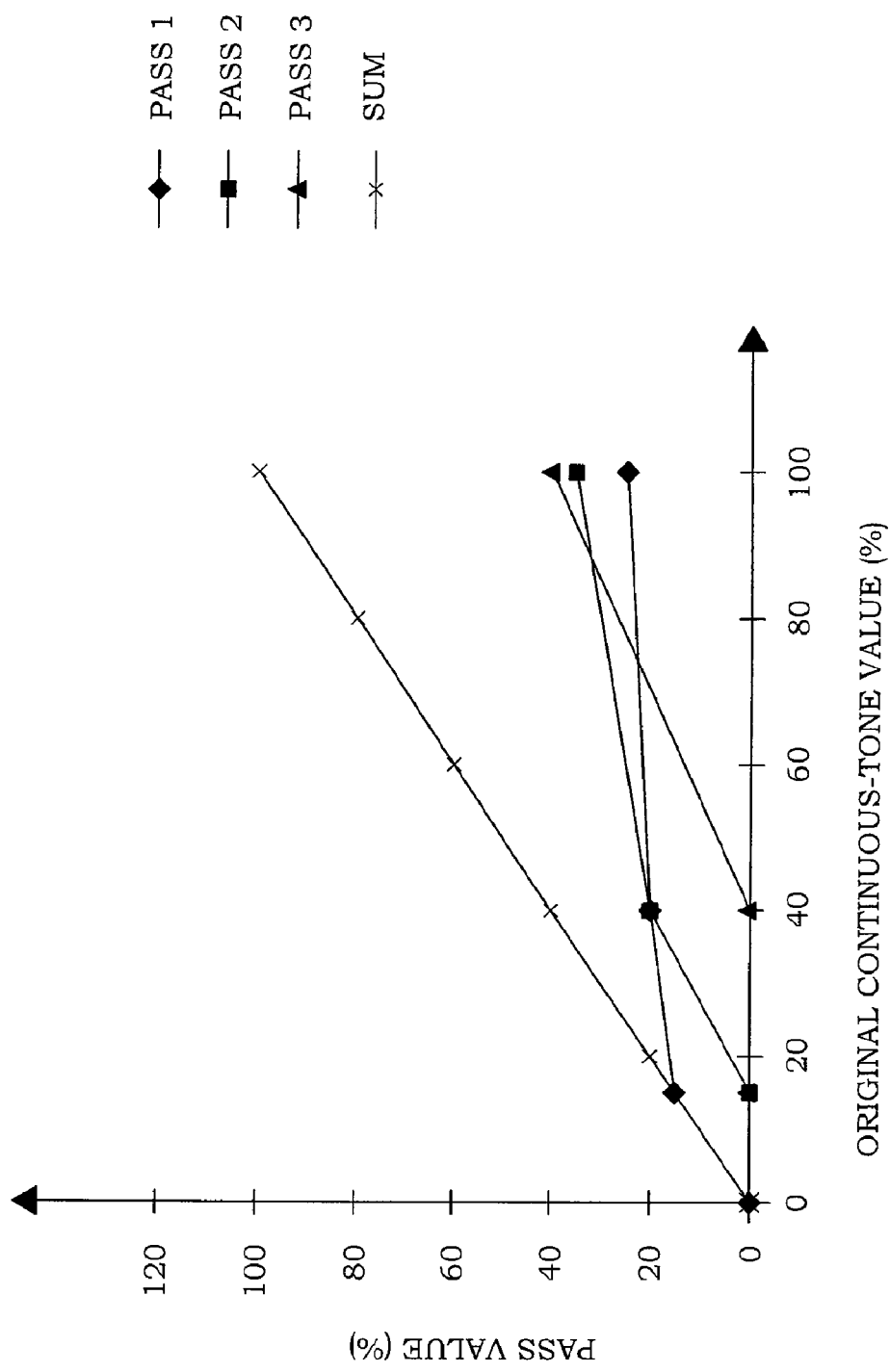
FIG. 11b shows a three-pass split curve, according to embodiments of a second aspect of the invention.

FIG. 11*b*: Three-Pass Split Curve for Preventing Graininess in Highlight Areas (Embodiment of the Second Aspect of the Invention)

FIG. 11*b* refers to a split curve used in three-pass printing. Continuous-tone values below 16% are only printed in the first pass. In the section between 16% and 40%, continuous-tone values are printed in the first and second pass, and continuous-tone values above 40% are printed in three passes. It should be mentioned that pass values of the third pass increase more strongly than the pass values of the first and second passes. At an intensity of 72%, the third pass values overtakes the pass values of the first pass, and at an intensity of 88%, the third pass values also overtake the pass values of the second pass. A fourth line (the identical straight line) indicates that all continuous-tone values are split into corresponding pass values such that the sum of these pass values is equal to the continuous-tone value.

Figure 12A:
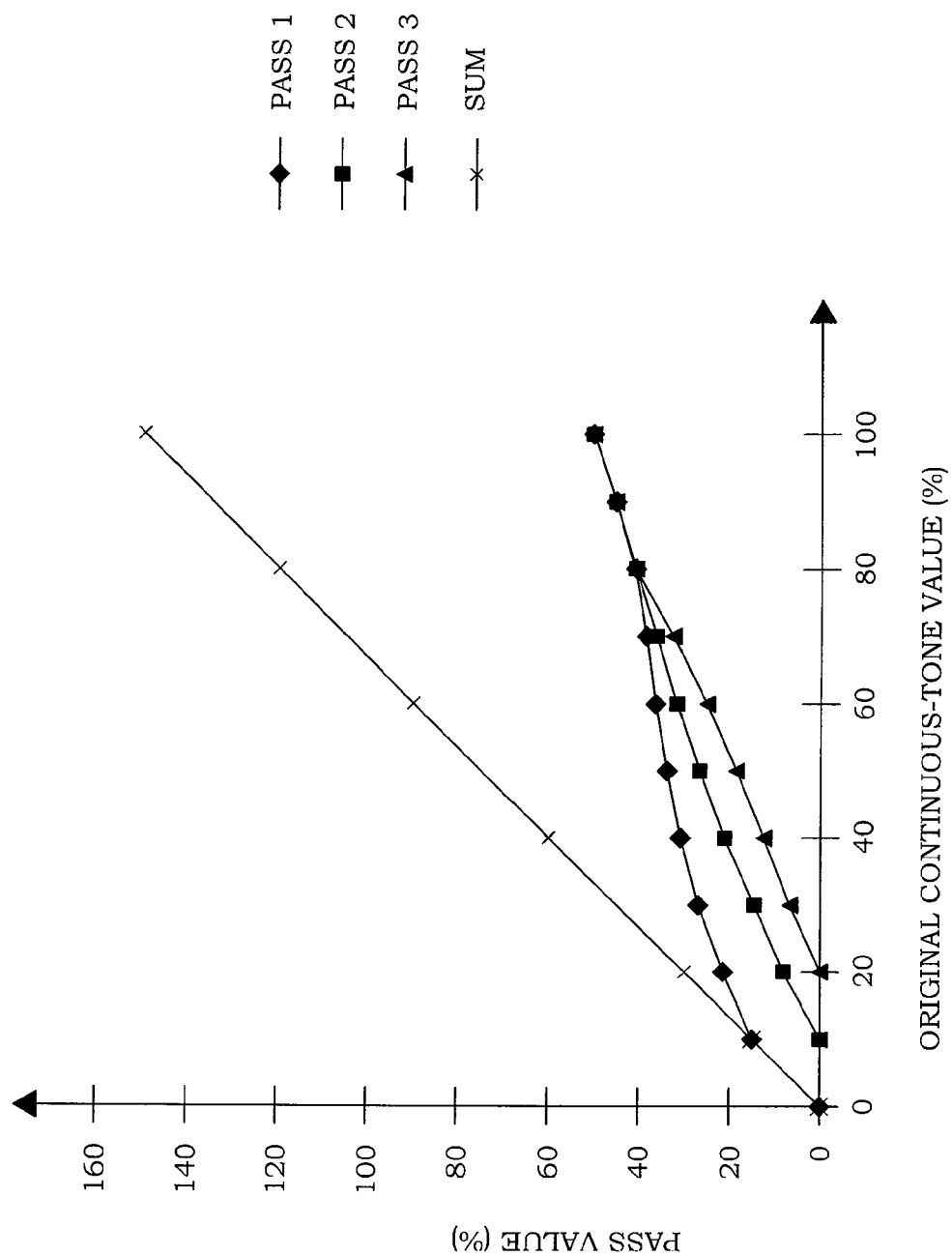
FIG. 12a shows a split curve used in three-pass printing that results in a density higher than the density of the continuous-tone value to be represented, according to embodiments of a third aspect of the invention.

FIG. 12: Split Curve for Density Correction for Constant Overprinting Percentage (Embodiment of the Third Aspect of the Invention)

To compensate for the loss of density due to a number of overprinted dots, FIG. 11 shows a split curve, in which continuous-tone values are split such that the sum of the individual pass values exceeds the continuous-tone values. It should be mentioned that the individual pass values representing a continuous-tone value are overestimated such that their sum is equal to 1.5 times the continuous-tone value. For example, a continuous-tone value having an intensity of 40% is split into a first pass value having an intensity of 10%, a second pass value having an intensity of 20% and a third pass value with an intensity of 30% which makes up a total intensity of 60%. Since some of the dots are printed on top of each other, this results in a reduction of density which yields the actually desired density pertaining to an intensity value of 40%.

It should be mentioned that the density correction needed for multi-pass printing (due to overprinting effects) could be integrated in the calibration when mapping LAB color values (device-independent color values) to the CMYK values (device-dependent color values indicating an amount of ink to be printed to obtain a device-independent LAB color value) of the printing device. This calibration is implemented in the form of LUTs (look-up tables). However, the codomain of CMYK values is normally restricted (for example up to a value of 255). Therefore, it is more appropriate to first split the continuous-tone values (to which the calibration has already been applied), and then to apply a correction function which compensates for the loss of density due to overprinting effects.

Additionally, to overcome the graininess effects discussed above, the continuous-tone values having an intensity less than 10% are printed in one pass, whereas the continuous-tone values having an intensity between 10% and 20% are printed in two passes. Only continuous-tone values above an intensity of 20% are printed in three passes.

Figure 13A:
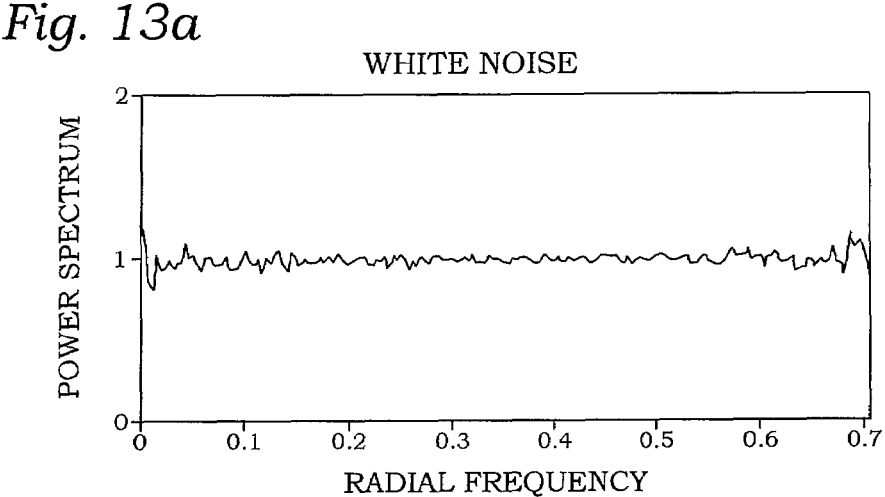
FIG. 13a shows a white-noise power spectrum.

Representing signals in the frequency domain can often simplify complexity seen in the spatial domain. This is indeed the case with dither patterns. It enables the distribution of energy and its consequences on the quality of the patterns to be examined:

FIG. 13*a*: White-Noise Power Spectrum

The first solution that comes to mind when considering the problem of how to distribute dots to form macroscopic averages is to form threshold with white-noise. While the technique will break up spurious contours, it suffers from graininess. This is due to the presence of long wavelengths (small frequencies) in the dither patterns. FIG. 13*a* shows the measured radially averaged power spectrum for white-noise patterns. Using a normalization, the same plot results for all gray levels. Dithering with a white-noise threshold halftone matrix produces patterns with a flat spectrum. The term "white-noise" comes from the fact that equal energy is present at all wavelengths. This includes energy at low frequencies, which is the cause of the grainy artifacts. While the higher frequencies tend to be invisible, the arbitrarily long wavelength of the low frequencies can be very noticeable and detract from the image content. A white-noise power spectrum may be obtained by using truly random halftone matrices.

Figure 13B:
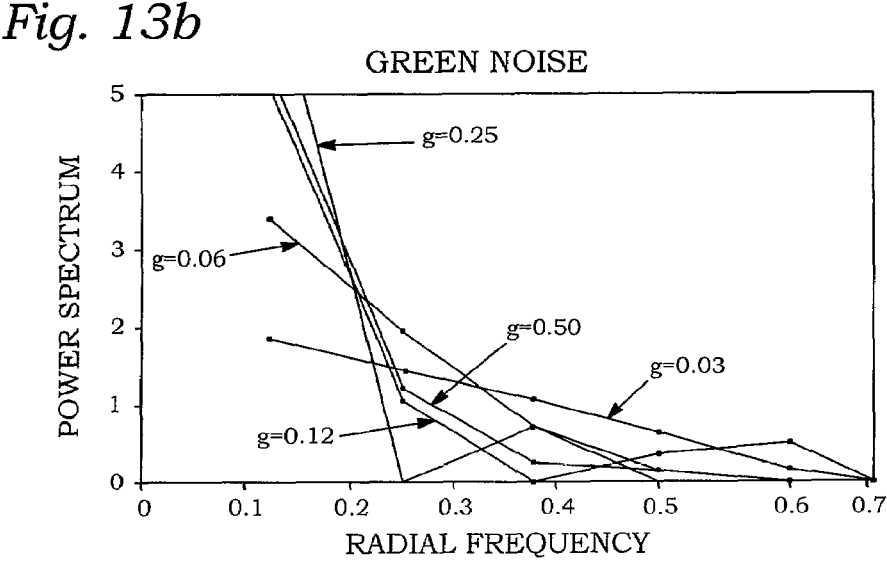
FIG. 13b shows typical power spectra of a green-noise halftoning model for different gray values.

FIG. 13b: Green-Noise Power Spectrum

FIG. 13b shows green-noise power spectra for five different gray values g (g=0.03, 0.06, 0.12, 0.25, 0.5). Green-noise power spectra may be obtained by using clustered-dot halftone matrices. Clustered-dot halftones are those that are commonly seen in mass hard copy publications produced by offset printing, such as in newspapers, magazines and books. As opposed to dispersed-dot patterns (blue-noise), the dots in clustered-dot patterns are nucleated in groups in regular intervals. Green-noise halftoning models may be obtained by using halftone matrices in which for low intensities, the few dots printed are dispersed (representing individual small dots), and for higher intensities (starting from a certain intensity threshold), the larger number of dots form clusters as in amplitude modulation halftoning.

Even in view of the popularity of dispersed-dot screens, this type of screen is still very important for many forms of printing.

In the case of white-noise, it was the low frequencies that contributed to graininess. So, in green-noise, one may assume that clustered-dot patterns will also suffer from mid-frequency (and low-frequency) textures, whereas this does not happen with high-frequency components.

Figure 13C:
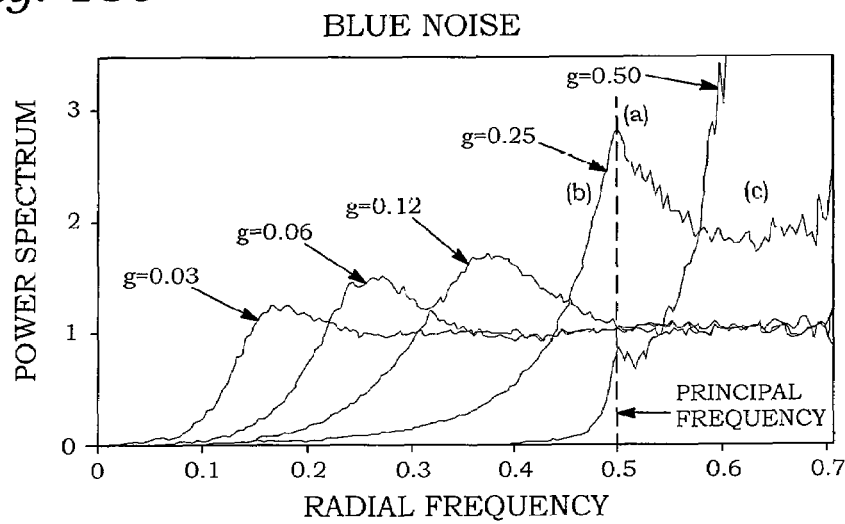
FIG. 13c shows typical power spectra of a blue-noise halftoning model for different gray values.

FIG. 13c: Blue-Noise Halftoning Model

Ideally, a well-formed dither pattern should have the unstructured nature of white-noise (power spectrum which is flat across all frequencies, much like the visible frequencies of light) without the low frequency textures. Consider the problem of rendering a fixed gray level g with binary dots whose vertical and horizontal pixel period, or separation is S. The goal is to distribute the binary pixels as homogenously as possible. These dots would be separated by an average distance in two dimensions. This distance is the principal wavelength and for this square pixel case would have the value $$\lambda_g = \begin{cases} S/\sqrt{g} & g \leq 1/2 \\ S/\sqrt{1-g} & g > 1/2 \end{cases}$$

Since the distribution is assumed to be homogenous, the corresponding power spectrum would be radially symmetric. The principal wavelength would be manifested as a principal frequency $f_g=1/\lambda_g$.

FIG. 13c shows spectra characteristics of a blue-noise dither pattern. There are three important features. The pattern should consist of an isotropic field of binary pixels with an average separation of $\lambda_g$. This corresponds to a peak energy at the principal frequency (a). The average separation should vary in an uncorrelated white-noise-like manner, but unlike white-noise the wavelengths of this variation must not be significantly longer than $\lambda_g$. So other key features of blue-noise spectra are (b) the sharp cut-off below the frequency, and (c) a flat white-noise-like spectrum above the principle frequency.

Blue-noise halftoning patterns may be obtained by using error diffusion techniques, or dispersed-dot halftone matrices, such as Bayer's matrices, or halftone matrices obtained by forced random dithering. As mentioned above, blue-noise halftoning may not be obtained by truly random dither matrices.

FIG. 14: Using Green-Noise and Blue-Noise Halftoning Models in Different Passes (Embodiments of the Fourth Aspect of the Invention)

FIG. 14 presents four cases, in which green-noise and blue-noise halftoning models are used to obtain independent sub-images.

In case a), the continuous-tone values are split into three equal pass values. In a first pass (making up the first sub-image), an error diffusion (ED) is used, whereas the pass values of the second pass are represented using a halftone matrix. Finally, the pass values of the third pass are represented using a clustered-dot halftone matrix (HM).

In case b), the continuous tone-values are split into four equal pass values. In the first pass, a green-noise halftone matrix is applied. In the second, third and fourth pass, an error diffusion technique is used. However, since the pass values are all equal, using the same error diffusion technique would lead to identical sub-images. Therefore, different types of error diffusion are applied for the different passes. In the example, the Floyd-Steinberg filter is used for the second pass, the Stucki filter for the third pass, and the Burkes filter for the fourth pass. In this way, although the second, third and fourth pass values are identical, three independent sub-images are obtained. The sub-image pertaining to the first pass differs anyway owing to the difference in power spectra of blue and green halftoning models.

In case c), a green-noise halftoning model is used for the first pass value, whereas the second, third and fourth pass values are represented using the same error diffusion technique, here the Floyd-Steinberg filter. To obtain independency among the sub-images pertaining to the error diffusion passes, the continuous-tone values are split into unequal portions.

In case d), independent sub-images are obtained by altering both, the portions of the pass values and the error diffusion methods applied. In the example, the continuous-tone values are split into 10%, 20%, 30% and 40%. While the first pass values are represented using a green-noise halftone matrix, the second pass employs the Burkes filter, the third pass value is represented using the Stucki filter, and the fourth pass value is represented using the Floyd-Steinberg filter.

It is to be understood, that even more than four passes may be employed to represent the continuous-tone values.

Moreover, it has been observed that when only using error diffusion techniques (see, for example, U.S. Pat. No. 6,505, 905), independent sub-images may also be obtained by using more than two passes and splitting the continuous-tone values into unequal portions. Each of the passes is then performed by using the same type of error diffusion, e.g. Floyd-Steinberg filter.

Instead of splitting the continuous-tone values into unequal pass value portions, and applying the same type of error diffusion, the continuous-tone values may be split into e.g. four equal portions (25%) and different types of error diffusions (type I-IV) are applied to the individual pass values.

Alternatively, both, the pass value portions and the type of error diffusion may be altered per pass. For example, 10% (error diffusion type I), 20% (error diffusion type II), 30% (error diffusion type III), 40% (error diffusion type IV). This approach also results in independent sub-images.

Incidentally, it is, of course, conceivable to split the continuous-tone values into more than four pass values, e.g. eight pass values, and to apply one or more error diffusion technique(s) to all of them.

FIG. 15: Summary of the Four Aspects of the Invention and their Background

FIG. 15 shows a table which summarizes the four aspects of the invention in the context of their background. The upper part of FIG. 15 deals with the problem of graininess and includes six approaches which deal with this problem, the lower part of FIG. 15 briefly summarizes the main idea of the third and fourth aspect of the invention.

A first approach which refers to the prior art document U.S. Pat. No. 6,505,905 teaches that independent sub-images can be obtained to reduce the graininess effect B and C which is especially perceived in medium and dark areas. The document explains that the continuous-tone values should be split (60%-40%) into unequal portions and that they may be represented by means of an error diffusion technique. However, the graininess effect in highlight areas due to independent sub-images remains which is indicated by an arrow directed upwards. The graininess effects B and C are low, and are therefore indicated by arrows directed downwards. The arrows in column B and C in highlight areas are in brackets, since the graininess effect B and C is generally not very much pronounced in highlight areas.

One approach which would overcome this graininess effect A (and also the graininess effect B and C) entirely refers to printing all continuous-tone values in one pass only. However, this approach has the crucial disadvantage that "banding effects" occur in single-pass printing; these effects are highly reduced in multi-pass printing.

A third approach, which is inverse to the first approach with regard to overcoming the three causes of graininess, refers to using one and the same halftone matrix for both passes. By this approach, the graininess effect A may be overcome, whereas the graininess effects B and C are increased. However, this graininess effect primarily appears in medium and dark areas.

A fourth approach, according to a first aspect of the invention, would be to obtain an independent halftone matrix for the second pass by applying a global shift to the matrix used in the first pass. Thereby, independent sub-images are created, whereby, however, the graininess effect A is not overcome.

A synthesis of the third and fourth approach results in a fifth approach, which also refers to the first aspect of the invention. Matrix elements are shifted as a function of the intensity of the pass value they are compared to. If a pass value of the first pass refers to a low intensity, the corresponding pass value of the second pass will be compared with the same threshold to which the first pass value was compared. If a pass value of the first pass refers to a high intensity, the corresponding pass value of the second pass will be compared with a threshold obtained by shifting the halftone matrix.

A sixth approach, which refers to a second aspect of the invention, teaches that highlight values should be printed in one pass only, whereas medium and darker values are to be printed in two or more passes using independent halftone matrices. As a result, there is no graininess at all in highlight areas since they are printed in one pass only. In medium and darker areas, the graininess effects B and C are reduced since these areas are represented using independent halftone matrices. This approach is equally applicable in the context of error diffusion techniques providing independent halftone patterns.

The third aspect of the invention deals with the problem that overprinting causes a loss of density since two dots printed on top of each other have a lower density than two dots printed next to each other. To compensate for this loss of density, a continuous-tone value is split into pass values such that the sum of pass values exceeds the continuous-tone value. This aspect of the invention may be used in the context of error diffusion as well as in the context of halftone matrices since overprinting may occur in both approaches. The correction of the pass value may be linear, if it is assumed than a constant percentage of dots is overprinted (when using the same matrix for both passes), or other correction functions may be applied when the halftone matrices for both passes are independent from each other. It should be mentioned that the correction of loss of density may be combined with the first and second aspect (approaches #4, #5, and #6) of the invention to reduce graininess effects.

The fourth aspect of the invention teaches to obtain independent sub-images by using different halftoning models for the different passes. This aspect of the invention may be combined with the second aspect of the invention (approach #6) to reduce graininess in highlight regions (while the other graininess effects are reduced by means of the independent sub-images resulting from different halftoning models.)

Thus, some of the aspects of the invention described above enable graininess effects in multi-pass printing to be reduced. Other aspects deal with density correction and obtainment of independent sub-images using different halftoning models.

All publications and existing systems mentioned in this specification are herein incorporated by reference.

Although certain methods and products constructed in accordance with the teachings of the invention have been described herein, the scope of intensity of this patent is not limited thereto. On the contrary, this patent covers all embodiments of the teachings of the invention fairly falling within the scope of the appended claims either literally or under the doctrine of equivalents.

The invention claimed is:

1. A multi-pass printing system for printing an image, comprising a plurality of continuous-tone values, based on halftone matrices having threshold values, the printed image being composed of sub-images, each of which comprising dots printed in a respective pass, the sub-images presenting independent dot patterns at corresponding places, the printing system being arranged to obtain the sub-images by splitting the continuous-tone values into at least two pass values, an individual pass value indicating an intensity to be printed in a respective pass, using in one pass a first halftone matrix for printing the respective pass values, and using in another pass one or more second halftone matrices, obtained by positionally shifting the threshold values of the first halftone matrix, for printing all pass values of the other pass, or at least those pass values above a highlight threshold.

2. The printing system of claim 1, wherein the printing system is arranged such that for those pass values of the other pass which is below the highlight threshold, the first non-shifted halftone matrix is used.

3. The printing system of claim 2, wherein the printing system is arranged such that a set of second matrices is used, the different matrices of the set being obtained by different shifts, and wherein using in another pass the second halftone matrices comprises selecting for a pass value one of the set of second halftone matrices depending on the intensity of the pass value.

4. A multi-pass printing system for printing an image comprising a plurality of continuous-tone values to be printed as dot patterns, the printed image being composed of sub-images, each of which comprising the dots printed in a respective pass, the sub-images being obtained by independently halftoning split continuous-tone values, the printing system being arranged to split the continuous-tone values such that if a continuous-tone value is greater than or equal to a highlight threshold, the continuous-tone value is split into a first number of pass values, and otherwise, the continuous-tone value is split into a second, smaller number of pass values, an individual pass value indicating an intensity to be printed in a respective pass, and print the continuous-tone values of the image in the first and second numbers of pass values, respectively.

5. The printing system of claim 4, wherein the first number of pass values is two, and the second number of pass values is one.

6. The printing system of claim 4, wherein independently halftoning split continuous-tone values comprises applying independent halftone matrices for different passes.

7. The printing system of claim 6, wherein applying independent halftone matrices comprises applying halftone matrices whose threshold values are relatively shifted to each other.

8. The printing system of claim 4, wherein independently haiftoning split continuous-tone values comprises splitting the continuous-tone values unequally and applying an error diffusion.

9. A multi-pass printing system for printing a continuous-tone value of an image comprising a plurality of continuous-tone values to be printed as dot patterns, the printed image being composed of sub-images, each of which comprising the dots printed in a respective pass, the sub-images being obtained by independently halftoning split continuous-tone values, the printing system being arranged to split the continuous-tone value to be printed into at least two pass values, an individual pass value indicating an intensity to be printed in a respective pass, wherein the splitting comprises a correction for an overprint effect such that the sum of the pass values corresponding to the continuous-tone value exceeds the continuous-tone value, and print the continuous-tone value in the number of pass values.

10. The printing system of claim 9, wherein independently halftoning split continuous-tone values comprises using independent halftone matrices for different passes.

11. The printing system of claim 10, wherein using independent halftone matrices comprises using relatively shifted halftone matrices.

12. The printing system of claim 11, wherein, for those pass values which are below a highlight threshold, the non-shifted matrix is used.

13. The printing system of claim 10, wherein a pair of halftone matrices are independent when a corresponding correlation coefficient is between about −1.0 and 0.75.

14. The printing system of claim 13, wherein the correlation coefficient is a Bravais-Pearson correlation coefficient.

15. The printing system of claim 9, wherein independently halftoning split continuous-tone values comprises splitting the continuous-tone values in unequal portions and using an error diffusion to represent them.

16. The printing system of claim 9, wherein halftoning split continuous-tone values comprises leaving continuous-tone values below a highlight threshold unsplit or splitting them into a smaller number to reduce graininess in highlight areas.

17. The printing system of claim 9, wherein the continuous-tone value is split into a first number of pass values if the continuous-tone value is greater than or equal to a highlight threshold, and the continuous-tone value is split into a second, smaller number of pass values otherwise, wherein the second number of pass values is at least two.

18. A multi-pass printing system for printing an image comprising a plurality of continuous-tone values to be printed as dot patterns, the printed image being composed of sub-images, each of which comprising the dots printed in a corresponding pass, the sub-images presenting independent dot patterns at corresponding places, the printing system being arranged to obtain the sub-images by splitting the continuous-tone values into at least two pass values, an individual pass value indicating an intensity to be printed in a respective pass, using at least two different halftoning models in different passes to print the respective pass values, wherein the different halftoning models are selected from a group comprising:

a blue-noise halftoning model, a green-noise halftoning model, and a white-noise halftoning model.

19. The printing system of claim 18, wherein at least one of the different halftoning models is implemented using a halftone matrix.

20. The printing system of claim 18, wherein the blue-noise halftoning model comprises dispersed-dot halftone matrices, wherein the green-noise halftoning model comprises clustered-dot halftone matrices, and the white-noise halftoning model comprises stochastic matrices.

21. The printing system of claim 18, wherein the blue-noise halftoning model is implemented by error diffusion.

22. A method of printing an image, comprising a plurality of continuous-tone values, based on halftone matrices having threshold values, the printed image being composed of sub-images, each of which comprising dots printed in a respective pass, the sub-images presenting independent dot patterns at corresponding places, the sub-images being obtained by splitting the continuous-tone values into at least two pass values, an individual pass value indicating an intensity to be printed in a respective pass, using in one pass a first halftone matrix for printing the respective pass values, and using in another pass one or more second halftone matrices, obtained by positionally shifting the threshold values of the first halftone matrix, for printing all pass values of the other pass, or at least those pass values above a highlight threshold.

23. A multi-pass printing system for printing an image comprising a plurality of continuous-tone values to be printed as dot patterns, the printed image being composed of sub-images, each of which comprising the dots printed in a respective pass, the sub-images being obtained by independently halftoning split continuous-tone values, the printing system comprising:

means for splitting the continuous-tone values such that if a continuous-tone value is greater than or equal to a highlight threshold, the continuous-tone value is split into a first number of pass values, and otherwise, the continuous-tone value is split into a second, smaller number of pass values, an individual pass value indicating an intensity to be printed in a respective pass, and means for printing the continuous-tone values of the image in the first and second numbers of pass values, respectively.

24. The printing system of claim 23, wherein the first number of pass values is two, and the second number of pass values is one.

25. The printing system of claim 23, wherein independently halftoning split continuous-tone values comprises applying independent halftone matrices for different passes.

26. The printing system of claim 25, wherein using independent halftone matrices comprises using relatively shifted halftone matrices.

27. The printing system of claim 26, wherein, for those pass values which are below a highlight threshold, the non-shifted matrix is used.

28. The printing system of claim 23, wherein independently halftoning split continuous-tone values comprises splitting the continuous-tone values unequally and applying an error diffusion.

29. The printing system of claim 23, wherein splitting the continuous-tone values comprises a correction for an over-print effect such that the sum of the pass values corresponding to the continuous-tone value exceeds the continuous-tone value.

* * * * *

UNITED STATES PATENT AND TRADEMARK OFFICE
CERTIFICATE OF CORRECTION

PATENT NO. : 7,513,589 B2  Page 1 of 1
APPLICATION NO. : 11/669516
DATED : April 7, 2009
INVENTOR(S) : Dror Eldar et al.

It is certified that error appears in the above-identified patent and that said Letters Patent is hereby corrected as shown below:

On the title page, item (54), in "Title", in column 1, line 1, delete "MULTIPASS" and insert -- MULTI-PASS --, therefor.

In column 1, line 1, delete "MULTIPASS" and insert -- MULTI-PASS --, therefor.

In column 2, line 40, after "two pass" delete "is".

In column 3, line 50, after "shifting the" delete "is".

In column 6, line 6, after "as" delete "is".

In column 8, line 4, after "Floyd and" delete "is".

In column 9, line 25, after "print" delete "is".

In column 12, line 36, after "second" delete "is".

In column 13, line 11, after "the" delete "is".

In column 29, line 16, in Claim 8, delete "haiftoning" and insert -- halftoning --, therefor.

Signed and Sealed this

First Day of September, 2009

David J. Kappos
*Director of the United States Patent and Trademark Office*